US011386120B2

(12) United States Patent
Cantwell et al.

(10) Patent No.: US 11,386,120 B2
(45) Date of Patent: Jul. 12, 2022

(54) DATA SYNCING IN A DISTRIBUTED SYSTEM

(71) Applicant: NetApp, Inc., Sunnyvale, CA (US)

(72) Inventors: Jared Cantwell, Boulder, CO (US);
Bill Minckler, Broomfield, CO (US);
Joe Roback, Fort Collins, CO (US);
Jim Wittig, Boulder, CO (US)

(73) Assignee: NetApp, Inc., San Jose, CA (US)

( * ) Notice: Subject to any disclaimer, the term of this patent is extended or adjusted under 35 U.S.C. 154(b) by 52 days.

(21) Appl. No.: 16/853,660

(22) Filed: Apr. 20, 2020

(65) Prior Publication Data

US 2020/0250201 A1 Aug. 6, 2020

Related U.S. Application Data

(63) Continuation of application No. 14/684,929, filed on Apr. 13, 2015, now Pat. No. 10,628,443, which is a (Continued)

(51) Int. Cl.
G06F 16/27 (2019.01)
H04L 12/14 (2006.01)
(Continued)

(52) U.S. Cl.
CPC .......... *G06F 16/27* (2019.01); *H04L 12/1403* (2013.01); *H04L 41/145* (2013.01);
(Continued)

(58) Field of Classification Search
CPC . G06F 16/27; H04L 67/1095; H04L 12/1403; H04L 14/145; H04L 67/22; G06Q 10/1095; G06Q 30/016
See application file for complete search history.

(56) References Cited

U.S. PATENT DOCUMENTS 5,138,697 A 8/1992 Yamamoto et al.
5,375,216 A 12/1994 Moyer et al.
(Continued)

FOREIGN PATENT DOCUMENTS

EP 0726521 A2 8/1996
EP 1970821 A1 9/2008
(Continued)

OTHER PUBLICATIONS

International Search Report and the Written Opinion of the International Searching Authority received for PCT Application No. PCT/US15/16625 dated Sep. 17, 2015, 8 pages.
(Continued)

*Primary Examiner* — Patrice L Winder
*Assistant Examiner* — Angela M Widhalm de Rodrig
(74) *Attorney, Agent, or Firm* — Jaffery Watson Mendonsa & Hamilton LLP

(57) ABSTRACT

Disclosed are systems, computer-readable mediums, and methods for receiving a start replication message to replicate a source volume to a replicated volume. A source system forwards I/O requests to the replica server. A data structure associated with the replicated volume is initialized. A write request is received from the source system. The write data is written to the replicated volume and the data structure is updated. Source metadata associated with the source volume is received. The source metadata is compared with prior metadata associated with a prior point-in-time image of the source volume to determine blocks of data that have changed since the prior point-in-time image of the source volume. A first block is determined to not be retrieved based upon the data structure. A second block is determined to be retrieved based upon the data structure. The second block is received and written to the replicated volume.

22 Claims, 6 Drawing Sheets

Related U.S. Application Data continuation of application No. 14/186,847, filed on Feb. 21, 2014, now abandoned.

(51) Int. Cl.
| | | |
|---|---|---|
| *H04L 12/24* | (2006.01) | |
| *H04L 29/08* | (2006.01) | |
| *G06Q 30/00* | (2012.01) | |
| *G06Q 10/10* | (2012.01) | |
| *H04L 41/14* | (2022.01) | |
| *H04L 67/50* | (2022.01) | |
| *H04L 67/1095* | (2022.01) | |

(52) U.S. Cl.
CPC ........ *H04L 67/1095* (2013.01); *H04L 67/535* (2022.05); *G06Q 10/1095* (2013.01); *G06Q 30/016* (2013.01)

(56) References Cited

U.S. PATENT DOCUMENTS

| | | | |
|---|---|---|---|
| 5,459,857 | A | 10/1995 | Ludlam et al. |
| 5,511,190 | A | 4/1996 | Sharma et al. |
| 5,542,089 | A | 7/1996 | Lindsay et al. |
| 5,592,432 | A | 1/1997 | Vishlitzky et al. |
| 5,603,001 | A | 2/1997 | Sukegawa et al. |
| 5,611,073 | A | 3/1997 | Malpure et al. |
| 5,734,859 | A | 3/1998 | Yorimitsu et al. |
| 5,734,898 | A | 3/1998 | He |
| 5,751,993 | A | 5/1998 | Ofek et al. |
| 5,860,082 | A | 1/1999 | Smith et al. |
| 5,864,698 | A | 1/1999 | Krau et al. |
| 5,890,161 | A | 3/1999 | Helland et al. |
| 5,937,425 | A | 8/1999 | Ban |
| 5,974,421 | A | 10/1999 | Krishnaswamy et al. |
| 5,991,862 | A | 11/1999 | Ruane |
| 6,047,283 | A | 4/2000 | Braun et al. |
| 6,067,541 | A | 5/2000 | Raju et al. |
| 6,081,900 | A | 6/2000 | Subramaniam et al. |
| 6,219,800 | B1 | 4/2001 | Johnson et al. |
| 6,257,756 | B1 | 7/2001 | Zarubinsky et al. |
| 6,275,898 | B1 | 8/2001 | Dekoning |
| 6,347,337 | B1 | 2/2002 | Shah et al. |
| 6,363,385 | B1 | 3/2002 | Kedem et al. |
| 6,385,699 | B1 | 5/2002 | Bozman et al. |
| 6,397,307 | B2 | 5/2002 | Ohran |
| 6,434,555 | B1 | 8/2002 | Frolund et al. |
| 6,434,662 | B1 | 8/2002 | Greene et al. |
| 6,526,478 | B1 | 2/2003 | Kirby |
| 6,553,384 | B1 | 4/2003 | Frey et al. |
| 6,560,196 | B1 | 5/2003 | Wei |
| 6,567,817 | B1 | 5/2003 | Vanleer et al. |
| 6,578,158 | B1 | 6/2003 | Deitz et al. |
| 6,604,155 | B1 | 8/2003 | Chong, Jr. |
| 6,609,176 | B1 | 8/2003 | Mizuno |
| 6,640,312 | B1 | 10/2003 | Thomson et al. |
| 6,681,389 | B1 | 1/2004 | Engel et al. |
| 6,704,839 | B2 | 3/2004 | Butterworth et al. |
| 6,728,843 | B1 | 4/2004 | Pong et al. |
| 6,741,698 | B1 | 5/2004 | Jensen |
| 6,779,003 | B1 | 8/2004 | Midgley |
| 6,795,890 | B1 | 9/2004 | Sugai et al. |
| 6,895,500 | B1 | 5/2005 | Rothberg |
| 6,904,470 | B1 | 6/2005 | Ofer et al. |
| 6,912,645 | B2 | 6/2005 | Dorward et al. |
| 6,917,898 | B1 | 7/2005 | Kirubalaratnam et al. |
| 6,928,521 | B1 | 8/2005 | Burton et al. |
| 6,928,526 | B1 | 8/2005 | Zhu et al. |
| 6,961,865 | B1 | 11/2005 | Ganesh et al. |
| 7,003,565 | B2 | 2/2006 | Hind et al. |
| 7,028,218 | B2 | 4/2006 | Schwarm et al. |
| 7,039,694 | B2 | 5/2006 | Kampe et al. |
| 7,047,358 | B2 | 5/2006 | Lee et al. |
| 7,055,058 | B2 | 5/2006 | Lee et al. |
| 7,065,619 | B1 | 6/2006 | Zhu et al. |
| 7,093,086 | B1 | 8/2006 | Van Rietschote |
| 7,110,913 | B2 | 9/2006 | Monroe et al. |
| 7,152,142 | B1 | 12/2006 | Guha et al. |
| 7,167,951 | B2 | 1/2007 | Blades et al. |
| 7,174,379 | B2 | 2/2007 | Agarwal et al. |
| 7,177,853 | B1 | 2/2007 | Ezra et al. |
| 7,188,149 | B2 | 3/2007 | Kishimoto |
| 7,191,357 | B2 | 3/2007 | Holland et al. |
| 7,219,260 | B1 | 5/2007 | De Forest et al. |
| 7,249,150 | B1 | 7/2007 | Watanabe et al. |
| 7,251,663 | B1 | 7/2007 | Smith |
| 7,257,690 | B1 | 8/2007 | Baird |
| 7,305,579 | B2 | 12/2007 | Williams |
| 7,325,059 | B2 | 1/2008 | Barach et al. |
| 7,334,094 | B2 | 2/2008 | Fair |
| 7,334,095 | B1 | 2/2008 | Fair et al. |
| 7,366,865 | B2 | 4/2008 | Lakshmanamurthy et al. |
| 7,370,048 | B2 | 5/2008 | Loeb |
| 7,373,345 | B2 | 5/2008 | Carpentier et al. |
| 7,394,944 | B2 | 7/2008 | Boskovic et al. |
| 7,395,283 | B1 | 7/2008 | Atzmony et al. |
| 7,395,352 | B1 | 7/2008 | Lam et al. |
| 7,415,653 | B1 | 8/2008 | Bonwick et al. |
| 7,451,167 | B2 | 11/2008 | Bali et al. |
| 7,454,592 | B1 | 11/2008 | Shah et al. |
| 7,457,864 | B2 | 11/2008 | Chambliss et al. |
| 7,464,125 | B1 | 12/2008 | Orszag et al. |
| 7,519,725 | B2 | 4/2009 | Alvarez et al. |
| 7,526,685 | B2 | 4/2009 | Maso et al. |
| 7,529,780 | B1 | 5/2009 | Braginsky et al. |
| 7,529,830 | B2 | 5/2009 | Fujii |
| 7,543,100 | B2 | 6/2009 | Singhal |
| 7,543,178 | B2 | 6/2009 | McNeill et al. |
| 7,562,101 | B1 | 7/2009 | Jernigan, IV et al. |
| 7,562,203 | B2 | 7/2009 | Scott et al. |
| 7,603,391 | B1 | 10/2009 | Federwisch et al. |
| 7,603,529 | B1 | 10/2009 | Machardy et al. |
| 7,624,112 | B2 | 11/2009 | Ganesh et al. |
| 7,644,087 | B2 | 1/2010 | Barkai et al. |
| 7,650,476 | B2 * | 1/2010 | Ashour ............... G06F 11/2064 |
| | | | 711/143 |
| 7,657,578 | B1 | 2/2010 | Karr et al. |
| 7,668,885 | B2 | 2/2010 | Wittke et al. |
| 7,680,837 | B2 | 3/2010 | Yamato |
| 7,681,076 | B1 | 3/2010 | Sarma |
| 7,689,716 | B2 | 3/2010 | Short et al. |
| 7,701,948 | B2 | 4/2010 | Rabje et al. |
| 7,730,153 | B1 | 6/2010 | Gole et al. |
| 7,739,614 | B1 | 6/2010 | Hackworth |
| 7,743,035 | B2 | 6/2010 | Chen et al. |
| 7,757,056 | B1 | 7/2010 | Fair |
| 7,797,279 | B1 | 9/2010 | Starling et al. |
| 7,805,266 | B1 | 9/2010 | Dasu et al. |
| 7,805,583 | B1 | 9/2010 | Todd et al. |
| 7,814,064 | B2 | 10/2010 | Vingralek |
| 7,817,562 | B1 | 10/2010 | Kemeny |
| 7,818,525 | B1 | 10/2010 | Frost et al. |
| 7,831,736 | B1 | 11/2010 | Thompson |
| 7,831,769 | B1 | 11/2010 | Wen et al. |
| 7,849,098 | B1 | 12/2010 | Scales et al. |
| 7,849,281 | B2 | 12/2010 | Malhotra et al. |
| 7,873,619 | B1 | 1/2011 | Faibish et al. |
| 7,899,791 | B1 | 3/2011 | Gole |
| 7,917,726 | B2 | 3/2011 | Hummel et al. |
| 7,921,169 | B2 | 4/2011 | Jacobs et al. |
| 7,921,325 | B2 | 4/2011 | Kondo et al. |
| 7,949,693 | B1 | 5/2011 | Mason et al. |
| 7,953,878 | B1 | 5/2011 | Trimble |
| 7,962,709 | B2 | 6/2011 | Agrawal |
| 7,987,167 | B1 | 7/2011 | Kazar et al. |
| 7,996,636 | B1 | 8/2011 | Prakash et al. |
| 8,055,745 | B2 | 11/2011 | Atluri |
| 8,060,797 | B2 | 11/2011 | Hida et al. |
| 8,074,019 | B2 | 12/2011 | Gupta et al. |
| 8,078,918 | B2 | 12/2011 | Diggs et al. |
| 8,082,390 | B1 | 12/2011 | Fan et al. |
| 8,086,585 | B1 | 12/2011 | Brashers et al. |
| 8,089,969 | B2 | 1/2012 | Rabie et al. |
| 8,090,908 | B1 | 1/2012 | Bolen et al. |

(56) References Cited

U.S. PATENT DOCUMENTS

| | | |
|---|---|---|
| 8,099,396 B1 | 1/2012 | Novick et al. |
| 8,099,554 B1 | 1/2012 | Solomon et al. |
| 8,122,213 B2 | 2/2012 | Cherian et al. |
| 8,127,182 B2 | 2/2012 | Sivaperuman et al. |
| 8,131,926 B2 | 3/2012 | Lubbers et al. |
| 8,140,821 B1 | 3/2012 | Raizen |
| 8,140,860 B2 | 3/2012 | Haswell |
| 8,145,838 B1 | 3/2012 | Miller et al. |
| 8,156,016 B2 | 4/2012 | Zhang |
| 8,156,290 B1 | 4/2012 | Vanninen et al. |
| 8,156,306 B1 | 4/2012 | Raizen |
| 8,184,807 B2 | 5/2012 | Kato et al. |
| 8,205,065 B2 | 6/2012 | Matze |
| 8,209,587 B1 | 6/2012 | Taylor et al. |
| 8,214,868 B2 | 7/2012 | Hamilton et al. |
| 8,224,935 B1 | 7/2012 | Bandopadhyay et al. |
| 8,225,135 B2 | 7/2012 | Barrall et al. |
| 8,244,978 B2 | 8/2012 | Kegel et al. |
| 8,250,116 B2 | 8/2012 | Mazzagatti et al. |
| 8,261,085 B1 | 9/2012 | Fernandez |
| 8,312,231 B1 | 11/2012 | Li et al. |
| 8,327,103 B1 | 12/2012 | Can et al. |
| 8,332,357 B1* | 12/2012 | Chung .................. G06F 16/27 707/634 |
| 8,341,457 B2 | 12/2012 | Spry et al. |
| 8,369,217 B2 | 2/2013 | Bostica et al. |
| 8,417,987 B1 | 4/2013 | Goel et al. |
| 8,429,096 B1 | 4/2013 | Soundararajan et al. |
| 8,429,282 B1 | 4/2013 | Ahuja et al. |
| 8,452,929 B2 | 5/2013 | Bennett |
| 8,463,825 B1 | 6/2013 | Harty et al. |
| 8,468,180 B1 | 6/2013 | Meiri et al. |
| 8,468,368 B2 | 6/2013 | Gladwin et al. |
| 8,484,439 B1 | 7/2013 | Frailong et al. |
| 8,489,811 B1 | 7/2013 | Corbett et al. |
| 8,495,417 B2 | 7/2013 | Jernigan, IV et al. |
| 8,510,265 B1 | 8/2013 | Boone et al. |
| 8,515,965 B2 | 8/2013 | Mital et al. |
| 8,520,855 B1 | 8/2013 | Kohno et al. |
| 8,533,410 B1 | 9/2013 | Corbett et al. |
| 8,539,008 B2 | 9/2013 | Faith et al. |
| 8,543,611 B1 | 9/2013 | Mirtich et al. |
| 8,549,154 B2 | 10/2013 | Colrain et al. |
| 8,555,019 B2 | 10/2013 | Montgomery et al. |
| 8,560,879 B1 | 10/2013 | Goel |
| 8,566,508 B2 | 10/2013 | Borchers et al. |
| 8,566,617 B1 | 10/2013 | Clifford |
| 8,572,091 B1 | 10/2013 | Sivasubramanian et al. |
| 8,577,850 B1 | 11/2013 | Genda et al. |
| 8,583,865 B1 | 11/2013 | Sade et al. |
| 8,589,550 B1 | 11/2013 | Faibish et al. |
| 8,589,625 B2 | 11/2013 | Colgrove et al. |
| 8,595,434 B2 | 11/2013 | Northcutt et al. |
| 8,595,595 B1 | 11/2013 | Grcanac et al. |
| 8,600,949 B2 | 12/2013 | Periyagaram et al. |
| 8,645,664 B1 | 2/2014 | Colgrove et al. |
| 8,645,698 B2 | 2/2014 | Yi et al. |
| 8,671,265 B2 | 3/2014 | Wright |
| 8,706,692 B1 | 4/2014 | Luthra et al. |
| 8,706,701 B1 | 4/2014 | Stefanov et al. |
| 8,712,963 B1 | 4/2014 | Douglis et al. |
| 8,732,426 B2 | 5/2014 | Colgrove et al. |
| 8,745,338 B1 | 6/2014 | Yadav et al. |
| 8,751,763 B1 | 6/2014 | Ramarao |
| 8,762,654 B1 | 6/2014 | Yang et al. |
| 8,775,868 B2 | 7/2014 | Colgrove et al. |
| 8,782,439 B2 | 7/2014 | Resch |
| 8,787,580 B2 | 7/2014 | Hodges et al. |
| 8,799,571 B1 | 8/2014 | Desroches et al. |
| 8,799,601 B1 | 8/2014 | Chen et al. |
| 8,799,705 B2 | 8/2014 | Hallak et al. |
| 8,806,160 B2 | 8/2014 | Colgrove et al. |
| 8,812,450 B1 | 8/2014 | Kesavan et al. |
| 8,824,686 B1 | 9/2014 | Ishii et al. |
| 8,826,023 B1 | 9/2014 | Harmer et al. |
| 8,832,373 B2 | 9/2014 | Colgrove et al. |
| 8,843,711 B1 | 9/2014 | Yadav et al. |
| 8,849,764 B1 | 9/2014 | Long et al. |
| 8,850,108 B1 | 9/2014 | Hayes et al. |
| 8,850,216 B1 | 9/2014 | Mikhailov et al. |
| 8,855,318 B1 | 10/2014 | Patnala et al. |
| 8,856,593 B2 | 10/2014 | Eckhardt et al. |
| 8,868,868 B1 | 10/2014 | Maheshwari et al. |
| 8,874,842 B1 | 10/2014 | Kimmel et al. |
| 8,880,787 B1 | 11/2014 | Kimmel et al. |
| 8,880,788 B1 | 11/2014 | Sundaram et al. |
| 8,892,818 B1 | 11/2014 | Zheng et al. |
| 8,904,137 B1 | 12/2014 | Zhang et al. |
| 8,904,231 B2 | 12/2014 | Coatney et al. |
| 8,922,928 B2 | 12/2014 | Powell |
| 8,930,778 B2 | 1/2015 | Cohen |
| 8,943,032 B1 | 1/2015 | Xu et al. |
| 8,943,282 B1 | 1/2015 | Armangau et al. |
| 8,949,568 B2 | 2/2015 | Wei et al. |
| 8,977,781 B1 | 3/2015 | Yokoi et al. |
| 8,996,468 B1 | 3/2015 | Mattox |
| 8,996,535 B1 | 3/2015 | Kimmel et al. |
| 8,996,790 B1 | 3/2015 | Segal et al. |
| 8,996,797 B1 | 3/2015 | Zheng et al. |
| 9,003,162 B2 | 4/2015 | Lomet et al. |
| 9,009,449 B2 | 4/2015 | Chou et al. |
| 9,021,303 B1 | 4/2015 | Desouter et al. |
| 9,026,694 B1 | 5/2015 | Davidson et al. |
| 9,037,544 B1 | 5/2015 | Zheng et al. |
| 9,047,211 B2 | 6/2015 | Wood et al. |
| 9,058,119 B1 | 6/2015 | Ray, III et al. |
| 9,092,142 B2 | 7/2015 | Nashimoto |
| 9,152,684 B2 | 10/2015 | Zheng et al. |
| 9,170,746 B2 | 10/2015 | Sundaram et al. |
| 9,195,939 B1 | 11/2015 | Goyal et al. |
| 9,201,742 B2 | 12/2015 | Bulkowski et al. |
| 9,201,804 B1 | 12/2015 | Egyed |
| 9,225,801 B1 | 12/2015 | McMullen et al. |
| 9,229,642 B2 | 1/2016 | Shu et al. |
| 9,256,549 B2 | 2/2016 | Kimmel et al. |
| 9,268,502 B2 | 2/2016 | Zheng et al. |
| 9,274,901 B2 | 3/2016 | Veerla et al. |
| 9,286,413 B1 | 3/2016 | Coates et al. |
| 9,298,417 B1 | 3/2016 | Muddu et al. |
| 9,367,241 B2 | 6/2016 | Sundaram et al. |
| 9,378,043 B1 | 6/2016 | Zhang et al. |
| 9,389,958 B2 | 7/2016 | Sundaram et al. |
| 9,405,783 B2 | 8/2016 | Kimmel et al. |
| 9,411,620 B2 | 8/2016 | Wang et al. |
| 9,413,680 B1 | 8/2016 | Kusters et al. |
| 9,418,131 B1* | 8/2016 | Halevi .................. G06F 16/27 |
| 9,438,665 B1 | 9/2016 | Vasanth et al. |
| 9,459,856 B2 | 10/2016 | Curzi et al. |
| 9,460,009 B1 | 10/2016 | Taylor et al. |
| 9,471,680 B2 | 10/2016 | Elsner et al. |
| 9,483,349 B2 | 11/2016 | Sundaram et al. |
| 9,537,827 B1 | 1/2017 | McMullen et al. |
| 9,572,091 B2 | 2/2017 | Lee et al. |
| 9,606,874 B2 | 3/2017 | Moore et al. |
| 9,639,293 B2 | 5/2017 | Guo et al. |
| 9,639,546 B1 | 5/2017 | Gorski et al. |
| 9,652,405 B1 | 5/2017 | Shain et al. |
| 9,690,703 B1 | 6/2017 | Jess et al. |
| 9,779,123 B2 | 10/2017 | Sen et al. |
| 9,785,525 B2 | 10/2017 | Watanabe et al. |
| 9,798,497 B1 | 10/2017 | Schick et al. |
| 9,817,858 B2 | 11/2017 | Eisenreich et al. |
| 9,846,642 B2 | 12/2017 | Choi et al. |
| 9,852,076 B1 | 12/2017 | Garg et al. |
| 9,953,351 B1 | 4/2018 | Sivasubramanian et al. |
| 9,954,946 B2 | 4/2018 | Shetty et al. |
| 10,216,966 B2 | 2/2019 | McClanahan et al. |
| 10,516,582 B2 | 12/2019 | Wright et al. |
| 10,565,230 B2 | 2/2020 | Zheng et al. |
| 10,642,763 B2 | 5/2020 | Longo et al. |
| 10,997,098 B2 | 5/2021 | Longo et al. |
| 2001/0056543 A1 | 12/2001 | Isomura et al. |
| 2002/0073354 A1 | 6/2002 | Schroiff et al. |
| 2002/0091897 A1 | 7/2002 | Chiu et al. |

(56) References Cited

U.S. PATENT DOCUMENTS

| | | |
|---|---|---|
| 2002/0116569 A1 | 8/2002 | Kim et al. |
| 2002/0156891 A1 | 10/2002 | Ulrich et al. |
| 2002/0158898 A1 | 10/2002 | Hsieh et al. |
| 2002/0174419 A1 | 11/2002 | Alvarez et al. |
| 2002/0175938 A1 | 11/2002 | Hackworth |
| 2002/0188711 A1 | 12/2002 | Meyer et al. |
| 2003/0005147 A1 | 1/2003 | Enns et al. |
| 2003/0028642 A1 | 2/2003 | Agarwal et al. |
| 2003/0084251 A1 | 5/2003 | Gaither et al. |
| 2003/0105928 A1 | 6/2003 | Ash et al. |
| 2003/0115204 A1 | 6/2003 | Greenblatt et al. |
| 2003/0115282 A1 | 6/2003 | Rose |
| 2003/0120869 A1 | 6/2003 | Lee et al. |
| 2003/0126118 A1 | 7/2003 | Burton et al. |
| 2003/0126143 A1 | 7/2003 | Roussopoulos et al. |
| 2003/0135609 A1 | 7/2003 | Carlson et al. |
| 2003/0135729 A1 | 7/2003 | Mason et al. |
| 2003/0145041 A1 | 7/2003 | Dunham et al. |
| 2003/0159007 A1 | 8/2003 | Sawdon et al. |
| 2003/0163628 A1 | 8/2003 | Lin et al. |
| 2003/0172059 A1 | 9/2003 | Andrei |
| 2003/0182312 A1 | 9/2003 | Chen et al. |
| 2003/0182322 A1 | 9/2003 | Manley et al. |
| 2003/0191916 A1 | 10/2003 | McBrearty et al. |
| 2003/0195895 A1 | 10/2003 | Nowicki et al. |
| 2003/0200388 A1 | 10/2003 | Hetrick |
| 2003/0212872 A1 | 11/2003 | Patterson et al. |
| 2003/0223445 A1 | 12/2003 | Lodha |
| 2004/0003173 A1 | 1/2004 | Yao et al. |
| 2004/0052254 A1 | 3/2004 | Hooper |
| 2004/0054656 A1 | 3/2004 | Leung et al. |
| 2004/0107281 A1 | 6/2004 | Bose et al. |
| 2004/0133590 A1 | 7/2004 | Henderson et al. |
| 2004/0133622 A1 | 7/2004 | Clubb et al. |
| 2004/0133742 A1 | 7/2004 | Vasudevan et al. |
| 2004/0153544 A1 | 8/2004 | Kelliher et al. |
| 2004/0153863 A1 | 8/2004 | Klotz et al. |
| 2004/0158549 A1 | 8/2004 | Matena et al. |
| 2004/0186858 A1 | 9/2004 | McGovern et al. |
| 2004/0205166 A1 | 10/2004 | Demoney |
| 2004/0210794 A1 | 10/2004 | Frey et al. |
| 2004/0215792 A1 | 10/2004 | Koning et al. |
| 2004/0236846 A1 | 11/2004 | Alvarez |
| 2004/0267836 A1 | 12/2004 | Armangau et al. |
| 2004/0267932 A1 | 12/2004 | Voellm et al. |
| 2005/0010653 A1 | 1/2005 | McCanne |
| 2005/0027817 A1 | 2/2005 | Novik |
| 2005/0039156 A1 | 2/2005 | Catthoor et al. |
| 2005/0043834 A1 | 2/2005 | Rotariu et al. |
| 2005/0044244 A1 | 2/2005 | Warwick et al. |
| 2005/0076113 A1 | 4/2005 | Klotz et al. |
| 2005/0076115 A1 | 4/2005 | Andrews et al. |
| 2005/0080923 A1 | 4/2005 | Elzur |
| 2005/0091261 A1 | 4/2005 | Wu et al. |
| 2005/0108472 A1 | 5/2005 | Kanai et al. |
| 2005/0119996 A1 | 6/2005 | Ohata et al. |
| 2005/0128951 A1 | 6/2005 | Chawla et al. |
| 2005/0138285 A1 | 6/2005 | Takaoka et al. |
| 2005/0144514 A1 | 6/2005 | Ulrich et al. |
| 2005/0177770 A1 | 8/2005 | Coatney et al. |
| 2005/0203930 A1 | 9/2005 | Bukowski et al. |
| 2005/0216503 A1 | 9/2005 | Charlot et al. |
| 2005/0228885 A1 | 10/2005 | Winfield et al. |
| 2005/0246362 A1 | 11/2005 | Borland |
| 2005/0246398 A1 | 11/2005 | Barzilai et al. |
| 2006/0004957 A1 | 1/2006 | Hand et al. |
| 2006/0071845 A1 | 4/2006 | Stroili et al. |
| 2006/0072555 A1 | 4/2006 | St. Hilaire et al. |
| 2006/0072593 A1 | 4/2006 | Grippo et al. |
| 2006/0074977 A1 | 4/2006 | Kothuri et al. |
| 2006/0075467 A1 | 4/2006 | Sanda et al. |
| 2006/0085166 A1 | 4/2006 | Ochi et al. |
| 2006/0101091 A1 | 5/2006 | Carbajales et al. |
| 2006/0101202 A1 | 5/2006 | Mannen et al. |
| 2006/0112155 A1 | 5/2006 | Earl et al. |
| 2006/0129676 A1 | 6/2006 | Modi et al. |
| 2006/0136718 A1 | 6/2006 | Moreillon |
| 2006/0156059 A1 | 7/2006 | Kitamura |
| 2006/0165074 A1 | 7/2006 | Modi et al. |
| 2006/0206671 A1 | 9/2006 | Aiello et al. |
| 2006/0232826 A1 | 10/2006 | Bar-El |
| 2006/0253749 A1 | 11/2006 | Alderegula et al. |
| 2006/0282662 A1 | 12/2006 | Whitcomb |
| 2006/0288151 A1 | 12/2006 | McKenney |
| 2007/0016617 A1 | 1/2007 | Lomet |
| 2007/0033376 A1 | 2/2007 | Sinclair et al. |
| 2007/0033433 A1 | 2/2007 | Pecone et al. |
| 2007/0061572 A1 | 3/2007 | Imai et al. |
| 2007/0064604 A1 | 3/2007 | Chen et al. |
| 2007/0083482 A1 | 4/2007 | Rathi |
| 2007/0083722 A1 | 4/2007 | Per et al. |
| 2007/0088702 A1 | 4/2007 | Fridella |
| 2007/0094452 A1 | 4/2007 | Fachan |
| 2007/0106706 A1 | 5/2007 | Ahrens et al. |
| 2007/0109592 A1 | 5/2007 | Parvathaneni et al. |
| 2007/0112723 A1 | 5/2007 | Alvarez et al. |
| 2007/0112955 A1 | 5/2007 | Clemm et al. |
| 2007/0136269 A1 | 6/2007 | Yamakabe et al. |
| 2007/0143359 A1 | 6/2007 | Uppala et al. |
| 2007/0186066 A1 | 8/2007 | Desai |
| 2007/0186127 A1 | 8/2007 | Desai |
| 2007/0208537 A1 | 9/2007 | Savoor et al. |
| 2007/0208918 A1 | 9/2007 | Harbin |
| 2007/0234106 A1 | 10/2007 | Lecrone et al. |
| 2007/0245041 A1 | 10/2007 | Hua et al. |
| 2007/0255530 A1 | 11/2007 | Wolff |
| 2007/0266037 A1 | 11/2007 | Terry et al. |
| 2007/0300013 A1 | 12/2007 | Kitamura |
| 2008/0019359 A1 | 1/2008 | Droux et al. |
| 2008/0065639 A1 | 3/2008 | Choudhary et al. |
| 2008/0071939 A1 | 3/2008 | Tanaka et al. |
| 2008/0104264 A1 | 5/2008 | Duerk et al. |
| 2008/0126695 A1 | 5/2008 | Berg |
| 2008/0127211 A1 | 5/2008 | Belsey et al. |
| 2008/0155190 A1 | 6/2008 | Ash et al. |
| 2008/0162079 A1 | 7/2008 | Astigarraga et al. |
| 2008/0162990 A1 | 7/2008 | Wang et al. |
| 2008/0165899 A1 | 7/2008 | Rahman |
| 2008/0168226 A1 | 7/2008 | Wang et al. |
| 2008/0184063 A1 | 7/2008 | Abdulvahid |
| 2008/0201535 A1 | 8/2008 | Hara |
| 2008/0212938 A1 | 9/2008 | Sato et al. |
| 2008/0228691 A1 | 9/2008 | Shavit et al. |
| 2008/0244158 A1 | 10/2008 | Funatsu et al. |
| 2008/0244354 A1 | 10/2008 | Wu et al. |
| 2008/0250270 A1 | 10/2008 | Bennett |
| 2008/0270719 A1 | 10/2008 | Cochran et al. |
| 2009/0019449 A1 | 1/2009 | Choi et al. |
| 2009/0031083 A1 | 1/2009 | Willis et al. |
| 2009/0037500 A1 | 2/2009 | Kirshenbaum |
| 2009/0037654 A1 | 2/2009 | Allison et al. |
| 2009/0043878 A1 | 2/2009 | Ni |
| 2009/0083478 A1 | 3/2009 | Kunimatsu et al. |
| 2009/0097654 A1 | 4/2009 | Blake |
| 2009/0132770 A1 | 5/2009 | Lin et al. |
| 2009/0144497 A1 | 6/2009 | Withers |
| 2009/0150537 A1 | 6/2009 | Fanson |
| 2009/0157870 A1 | 6/2009 | Nakadai |
| 2009/0193206 A1 | 7/2009 | Ishii et al. |
| 2009/0204636 A1 | 8/2009 | Li et al. |
| 2009/0210611 A1 | 8/2009 | Mizushima |
| 2009/0210618 A1 | 8/2009 | Bates et al. |
| 2009/0225657 A1 | 9/2009 | Haggar et al. |
| 2009/0235022 A1 | 9/2009 | Bates et al. |
| 2009/0235110 A1 | 9/2009 | Kurokawa et al. |
| 2009/0249001 A1 | 10/2009 | Narayanan et al. |
| 2009/0249019 A1 | 10/2009 | Wu et al. |
| 2009/0271412 A1 | 10/2009 | Lacapra |
| 2009/0276567 A1 | 11/2009 | Burkey |
| 2009/0276771 A1 | 11/2009 | Nickolov et al. |
| 2009/0285476 A1 | 11/2009 | Choe et al. |
| 2009/0299940 A1 | 12/2009 | Hayes et al. |
| 2009/0307290 A1 | 12/2009 | Barsness et al. |
| 2009/0313451 A1 | 12/2009 | Inoue et al. |

(56) References Cited

U.S. PATENT DOCUMENTS

| | | |
|---|---|---|
| 2009/0313503 A1 | 12/2009 | Atluri et al. |
| 2009/0327604 A1 | 12/2009 | Sato et al. |
| 2010/0011037 A1 | 1/2010 | Kazar |
| 2010/0023726 A1 | 1/2010 | Aviles |
| 2010/0030981 A1 | 2/2010 | Cook |
| 2010/0031000 A1 | 2/2010 | Flynn et al. |
| 2010/0031315 A1 | 2/2010 | Feng |
| 2010/0042790 A1 | 2/2010 | Mondal et al. |
| 2010/0057792 A1 | 3/2010 | Ylonen |
| 2010/0070701 A1 | 3/2010 | Iyigun et al. |
| 2010/0077101 A1 | 3/2010 | Wang et al. |
| 2010/0077380 A1 | 3/2010 | Baker et al. |
| 2010/0082648 A1 | 4/2010 | Potapov et al. |
| 2010/0082790 A1 | 4/2010 | Hussaini et al. |
| 2010/0122148 A1 | 5/2010 | Flynn et al. |
| 2010/0124196 A1 | 5/2010 | Bonar et al. |
| 2010/0161569 A1 | 6/2010 | Schreter |
| 2010/0161574 A1 | 6/2010 | Davidson et al. |
| 2010/0161850 A1 | 6/2010 | Otsuka |
| 2010/0169415 A1 | 7/2010 | Leggette et al. |
| 2010/0174677 A1 | 7/2010 | Zahavi et al. |
| 2010/0174714 A1 | 7/2010 | Asmundsson et al. |
| 2010/0191713 A1 | 7/2010 | Lomet et al. |
| 2010/0199009 A1 | 8/2010 | Koide |
| 2010/0199040 A1 | 8/2010 | Schnapp et al. |
| 2010/0205353 A1 | 8/2010 | Miyamoto et al. |
| 2010/0205390 A1 | 8/2010 | Arakawa |
| 2010/0217953 A1 | 8/2010 | Beaman et al. |
| 2010/0223385 A1 | 9/2010 | Gulley et al. |
| 2010/0228795 A1 | 9/2010 | Hahn et al. |
| 2010/0228999 A1 | 9/2010 | Maheshwari et al. |
| 2010/0250497 A1 | 9/2010 | Redlich et al. |
| 2010/0250712 A1 | 9/2010 | Ellison et al. |
| 2010/0262812 A1 | 10/2010 | Lopez et al. |
| 2010/0268983 A1 | 10/2010 | Raghunandan |
| 2010/0269044 A1 | 10/2010 | Ivanyi et al. |
| 2010/0280998 A1 | 11/2010 | Goebel et al. |
| 2010/0281080 A1 | 11/2010 | Rajaram et al. |
| 2010/0293147 A1 | 11/2010 | Snow et al. |
| 2010/0306468 A1 | 12/2010 | Shionoya |
| 2010/0309933 A1 | 12/2010 | Stark et al. |
| 2011/0004707 A1 | 1/2011 | Spry et al. |
| 2011/0022778 A1 | 1/2011 | Schibilla et al. |
| 2011/0035548 A1 | 2/2011 | Kimmel et al. |
| 2011/0066808 A1 | 3/2011 | Flynn et al. |
| 2011/0072008 A1 | 3/2011 | Mandal et al. |
| 2011/0078496 A1 | 3/2011 | Jeddeloh |
| 2011/0087929 A1 | 4/2011 | Koshiyama |
| 2011/0093674 A1 | 4/2011 | Frame et al. |
| 2011/0099342 A1* | 4/2011 | Ozdemir ............ G06F 11/2074 711/162 |
| 2011/0099419 A1 | 4/2011 | Lucas et al. |
| 2011/0119412 A1 | 5/2011 | Orfitelli |
| 2011/0119668 A1 | 5/2011 | Calder et al. |
| 2011/0126045 A1 | 5/2011 | Bennett et al. |
| 2011/0153603 A1 | 6/2011 | Adiba et al. |
| 2011/0153719 A1 | 6/2011 | Santoro et al. |
| 2011/0153972 A1 | 6/2011 | Laberge |
| 2011/0154103 A1 | 6/2011 | Bulusu et al. |
| 2011/0161293 A1 | 6/2011 | Vermeulen et al. |
| 2011/0161725 A1 | 6/2011 | Allen et al. |
| 2011/0173401 A1 | 7/2011 | Usgaonkar et al. |
| 2011/0191389 A1 | 8/2011 | Okamoto |
| 2011/0191522 A1 | 8/2011 | Condict et al. |
| 2011/0196842 A1 | 8/2011 | Timashev et al. |
| 2011/0202516 A1 | 8/2011 | Rugg et al. |
| 2011/0213928 A1 | 9/2011 | Grube et al. |
| 2011/0219106 A1 | 9/2011 | Wright |
| 2011/0231624 A1 | 9/2011 | Fukutomi et al. |
| 2011/0238857 A1 | 9/2011 | Certain et al. |
| 2011/0246733 A1 | 10/2011 | Usgaonkar et al. |
| 2011/0246821 A1 | 10/2011 | Eleftheriou et al. |
| 2011/0283048 A1 | 11/2011 | Feldman et al. |
| 2011/0286123 A1 | 11/2011 | Montgomery et al. |
| 2011/0289565 A1 | 11/2011 | Resch et al. |
| 2011/0296133 A1 | 12/2011 | Flynn et al. |
| 2011/0302572 A1 | 12/2011 | Kuncoro et al. |
| 2011/0307530 A1 | 12/2011 | Patterson |
| 2011/0311051 A1 | 12/2011 | Resch et al. |
| 2011/0314346 A1 | 12/2011 | Vas et al. |
| 2012/0003940 A1 | 1/2012 | Hirano |
| 2012/0011176 A1 | 1/2012 | Aizman |
| 2012/0011340 A1 | 1/2012 | Flynn et al. |
| 2012/0016840 A1 | 1/2012 | Lin et al. |
| 2012/0047115 A1 | 2/2012 | Subramanya et al. |
| 2012/0054746 A1 | 3/2012 | Vaghani et al. |
| 2012/0063306 A1 | 3/2012 | Sultan et al. |
| 2012/0066204 A1 | 3/2012 | Ball et al. |
| 2012/0072656 A1 | 3/2012 | Archak et al. |
| 2012/0072680 A1 | 3/2012 | Kimura et al. |
| 2012/0078856 A1 | 3/2012 | Linde |
| 2012/0084506 A1 | 4/2012 | Colgrove et al. |
| 2012/0109895 A1 | 5/2012 | Zwilling et al. |
| 2012/0109936 A1 | 5/2012 | Zhang et al. |
| 2012/0124282 A1 | 5/2012 | Frank et al. |
| 2012/0136834 A1 | 5/2012 | Zhao |
| 2012/0143877 A1 | 6/2012 | Kumar |
| 2012/0150869 A1 | 6/2012 | Wang et al. |
| 2012/0150930 A1 | 6/2012 | Jin et al. |
| 2012/0151118 A1 | 6/2012 | Flynn et al. |
| 2012/0166715 A1 | 6/2012 | Frost et al. |
| 2012/0166749 A1 | 6/2012 | Eleftheriou et al. |
| 2012/0185437 A1 | 7/2012 | Pavlov et al. |
| 2012/0197844 A1 | 8/2012 | Wang et al. |
| 2012/0210095 A1 | 8/2012 | Nellans et al. |
| 2012/0226668 A1 | 9/2012 | Dhamankar et al. |
| 2012/0226841 A1 | 9/2012 | Nguyen et al. |
| 2012/0239869 A1 | 9/2012 | Chiueh et al. |
| 2012/0240126 A1 | 9/2012 | Dice et al. |
| 2012/0243687 A1 | 9/2012 | Li et al. |
| 2012/0246129 A1 | 9/2012 | Rothschild et al. |
| 2012/0246392 A1 | 9/2012 | Cheon |
| 2012/0271868 A1 | 10/2012 | Fukatani et al. |
| 2012/0290629 A1 | 11/2012 | Beaverson et al. |
| 2012/0290788 A1 | 11/2012 | Klemm et al. |
| 2012/0303876 A1 | 11/2012 | Benhase et al. |
| 2012/0310890 A1 | 12/2012 | Dodd et al. |
| 2012/0311246 A1 | 12/2012 | McWilliams et al. |
| 2012/0311290 A1 | 12/2012 | White |
| 2012/0311292 A1 | 12/2012 | Maniwa et al. |
| 2012/0311568 A1 | 12/2012 | Jansen |
| 2012/0317084 A1 | 12/2012 | Liu |
| 2012/0317338 A1 | 12/2012 | Yi et al. |
| 2012/0317353 A1 | 12/2012 | Webman |
| 2012/0317395 A1 | 12/2012 | Segev et al. |
| 2012/0323860 A1 | 12/2012 | Yasa et al. |
| 2012/0324150 A1 | 12/2012 | Moshayedi et al. |
| 2012/0331471 A1 | 12/2012 | Ramalingam et al. |
| 2013/0007097 A1 | 1/2013 | Sambe |
| 2013/0007370 A1 | 1/2013 | Parikh et al. |
| 2013/0010966 A1 | 1/2013 | Li et al. |
| 2013/0013654 A1 | 1/2013 | Lacapra et al. |
| 2013/0018722 A1 | 1/2013 | Libby |
| 2013/0018854 A1 | 1/2013 | Condict |
| 2013/0019057 A1 | 1/2013 | Stephens et al. |
| 2013/0024641 A1 | 1/2013 | Talagala et al. |
| 2013/0042065 A1 | 2/2013 | Kasten et al. |
| 2013/0054927 A1 | 2/2013 | Raj et al. |
| 2013/0055358 A1 | 2/2013 | Short et al. |
| 2013/0060992 A1 | 3/2013 | Cho et al. |
| 2013/0061169 A1 | 3/2013 | Pearcy et al. |
| 2013/0073519 A1 | 3/2013 | Lewis |
| 2013/0073821 A1 | 3/2013 | Flynn et al. |
| 2013/0080679 A1 | 3/2013 | Bert |
| 2013/0080720 A1 | 3/2013 | Nakamura et al. |
| 2013/0083639 A1 | 4/2013 | Wharton et al. |
| 2013/0086006 A1 | 4/2013 | Colgrove et al. |
| 2013/0086270 A1 | 4/2013 | Nishikawa et al. |
| 2013/0086336 A1 | 4/2013 | Canepa et al. |
| 2013/0097341 A1 | 4/2013 | Oe et al. |
| 2013/0110783 A1 | 5/2013 | Wertheimer et al. |
| 2013/0110845 A1 | 5/2013 | Dua |
| 2013/0111374 A1 | 5/2013 | Hamilton et al. |
| 2013/0124776 A1 | 5/2013 | Hallak et al. |

(56) References Cited

U.S. PATENT DOCUMENTS

| | | |
|---|---|---|
| 2013/0138616 A1 | 5/2013 | Gupta |
| 2013/0138862 A1 | 5/2013 | Motwani et al. |
| 2013/0148504 A1 | 6/2013 | Ungureanu |
| 2013/0159512 A1 | 6/2013 | Groves et al. |
| 2013/0159815 A1 | 6/2013 | Jung et al. |
| 2013/0166724 A1 | 6/2013 | Bairavasundaram et al. |
| 2013/0166727 A1 | 6/2013 | Wright et al. |
| 2013/0166861 A1 | 6/2013 | Takano et al. |
| 2013/0173955 A1 | 7/2013 | Hallak et al. |
| 2013/0185403 A1 | 7/2013 | Vachharajani et al. |
| 2013/0185719 A1 | 7/2013 | Kar |
| 2013/0198480 A1 | 8/2013 | Jones et al. |
| 2013/0204902 A1 | 8/2013 | Wang et al. |
| 2013/0219048 A1 | 8/2013 | Arvidsson et al. |
| 2013/0219214 A1 | 8/2013 | Samanta et al. |
| 2013/0226877 A1 | 8/2013 | Nagai et al. |
| 2013/0227111 A1 | 8/2013 | Wright et al. |
| 2013/0227145 A1 | 8/2013 | Wright et al. |
| 2013/0227195 A1 | 8/2013 | Beaverson et al. |
| 2013/0227201 A1 | 8/2013 | Talagala et al. |
| 2013/0227236 A1 | 8/2013 | Flynn et al. |
| 2013/0232240 A1 | 9/2013 | Purusothaman et al. |
| 2013/0232261 A1 | 9/2013 | Wright |
| 2013/0238832 A1 | 9/2013 | Dronamraju et al. |
| 2013/0238876 A1 | 9/2013 | Fiske et al. |
| 2013/0238932 A1 | 9/2013 | Resch |
| 2013/0262404 A1 | 10/2013 | Daga et al. |
| 2013/0262412 A1 | 10/2013 | Hawton et al. |
| 2013/0262746 A1 | 10/2013 | Srinivasan |
| 2013/0262762 A1 | 10/2013 | Igashira et al. |
| 2013/0262805 A1 | 10/2013 | Zheng et al. |
| 2013/0268497 A1 | 10/2013 | Baldwin et al. |
| 2013/0275656 A1 | 10/2013 | Talagala et al. |
| 2013/0290249 A1 | 10/2013 | Merriman et al. |
| 2013/0290263 A1 | 10/2013 | Beaverson et al. |
| 2013/0298170 A1 | 11/2013 | Elarabawy et al. |
| 2013/0304998 A1 | 11/2013 | Palmer et al. |
| 2013/0305002 A1 | 11/2013 | Hallak et al. |
| 2013/0311740 A1 | 11/2013 | Watanabe et al. |
| 2013/0325828 A1 | 12/2013 | Larson et al. |
| 2013/0326546 A1 | 12/2013 | Bavishi et al. |
| 2013/0339629 A1 | 12/2013 | Alexander et al. |
| 2013/0346700 A1 | 12/2013 | Tomlinson et al. |
| 2013/0346720 A1 | 12/2013 | Colgrove et al. |
| 2013/0346810 A1 | 12/2013 | Kimmel et al. |
| 2014/0006353 A1 | 1/2014 | Chen |
| 2014/0013068 A1 | 1/2014 | Yamato et al. |
| 2014/0025986 A1 | 1/2014 | Kalyanaraman et al. |
| 2014/0052764 A1 | 2/2014 | Michael et al. |
| 2014/0059309 A1 | 2/2014 | Brown et al. |
| 2014/0068184 A1 | 3/2014 | Edwards et al. |
| 2014/0081906 A1 | 3/2014 | Geddam et al. |
| 2014/0081918 A1 | 3/2014 | Srivas et al. |
| 2014/0082255 A1 | 3/2014 | Powell |
| 2014/0082273 A1 | 3/2014 | Segev |
| 2014/0089264 A1 | 3/2014 | Talagala et al. |
| 2014/0089683 A1 | 3/2014 | Miller et al. |
| 2014/0095758 A1 | 4/2014 | Smith et al. |
| 2014/0095803 A1 | 4/2014 | Kim et al. |
| 2014/0101115 A1 | 4/2014 | Ko et al. |
| 2014/0101298 A1 | 4/2014 | Shukla et al. |
| 2014/0108350 A1 | 4/2014 | Marsden |
| 2014/0108797 A1 | 4/2014 | Johnson et al. |
| 2014/0108863 A1 | 4/2014 | Nowoczynski et al. |
| 2014/0129830 A1 | 5/2014 | Raudaschl |
| 2014/0143207 A1 | 5/2014 | Brewer et al. |
| 2014/0143213 A1 | 5/2014 | Tal et al. |
| 2014/0149355 A1 | 5/2014 | Gupta et al. |
| 2014/0149647 A1 | 5/2014 | Guo et al. |
| 2014/0164715 A1 | 6/2014 | Weiner et al. |
| 2014/0172811 A1 | 6/2014 | Green |
| 2014/0181370 A1 | 6/2014 | Cohen et al. |
| 2014/0185615 A1 | 7/2014 | Ayoub et al. |
| 2014/0195199 A1 | 7/2014 | Uluyol |
| 2014/0195480 A1 | 7/2014 | Talagala et al. |
| 2014/0195492 A1 | 7/2014 | Wilding et al. |
| 2014/0195564 A1 | 7/2014 | Talagala et al. |
| 2014/0208003 A1 | 7/2014 | Cohen et al. |
| 2014/0215129 A1 | 7/2014 | Kuzmin et al. |
| 2014/0215147 A1 | 7/2014 | Pan |
| 2014/0215170 A1 | 7/2014 | Scarpino et al. |
| 2014/0215262 A1 | 7/2014 | Li et al. |
| 2014/0223029 A1 | 8/2014 | Bhaskar et al. |
| 2014/0223089 A1 | 8/2014 | Kang et al. |
| 2014/0244962 A1 | 8/2014 | Arges et al. |
| 2014/0250440 A1 | 9/2014 | Carter et al. |
| 2014/0258681 A1 | 9/2014 | Prasky et al. |
| 2014/0259000 A1 | 9/2014 | Desanti et al. |
| 2014/0279917 A1 | 9/2014 | Minh et al. |
| 2014/0279931 A1 | 9/2014 | Gupta et al. |
| 2014/0281017 A1 | 9/2014 | Apte |
| 2014/0281055 A1 | 9/2014 | Davda et al. |
| 2014/0281123 A1 | 9/2014 | Weber |
| 2014/0281131 A1 | 9/2014 | Joshi et al. |
| 2014/0283118 A1 | 9/2014 | Anderson et al. |
| 2014/0289476 A1 | 9/2014 | Nayak |
| 2014/0297980 A1 | 10/2014 | Yamazaki |
| 2014/0304548 A1 | 10/2014 | Steffan et al. |
| 2014/0310231 A1 | 10/2014 | Sampathkumaran |
| 2014/0310373 A1 | 10/2014 | Aviles et al. |
| 2014/0317093 A1 | 10/2014 | Sun et al. |
| 2014/0325117 A1 | 10/2014 | Canepa et al. |
| 2014/0325147 A1 | 10/2014 | Nayak |
| 2014/0344216 A1 | 11/2014 | Abercrombie et al. |
| 2014/0344222 A1 | 11/2014 | Morris |
| 2014/0344539 A1 | 11/2014 | Gordon et al. |
| 2014/0372384 A1 | 12/2014 | Long et al. |
| 2014/0379965 A1 | 12/2014 | Gole et al. |
| 2014/0379990 A1 | 12/2014 | Pan et al. |
| 2014/0379991 A1 | 12/2014 | Lomet et al. |
| 2014/0380092 A1 | 12/2014 | Kim et al. |
| 2015/0019792 A1 | 1/2015 | Swanson et al. |
| 2015/0032928 A1 | 1/2015 | Andrews et al. |
| 2015/0039716 A1 | 2/2015 | Przykucki, Jr. et al. |
| 2015/0039745 A1 | 2/2015 | Degioanni et al. |
| 2015/0039852 A1 | 2/2015 | Sen et al. |
| 2015/0040052 A1 | 2/2015 | Noel et al. |
| 2015/0052315 A1 | 2/2015 | Ghai et al. |
| 2015/0058577 A1 | 2/2015 | Earl |
| 2015/0066852 A1 | 3/2015 | Beard |
| 2015/0085665 A1 | 3/2015 | Kompella et al. |
| 2015/0085695 A1 | 3/2015 | Ryckbosch et al. |
| 2015/0089138 A1 | 3/2015 | Tao et al. |
| 2015/0089285 A1 | 3/2015 | Lim et al. |
| 2015/0095555 A1 | 4/2015 | Asnaashari et al. |
| 2015/0106556 A1 | 4/2015 | Yu et al. |
| 2015/0112939 A1 | 4/2015 | Cantwell et al. |
| 2015/0120754 A1 | 4/2015 | Chase et al. |
| 2015/0121021 A1 | 4/2015 | Nakamura et al. |
| 2015/0127922 A1 | 5/2015 | Camp et al. |
| 2015/0134926 A1 | 5/2015 | Yang et al. |
| 2015/0169414 A1 | 6/2015 | Lalsangi et al. |
| 2015/0172111 A1 | 6/2015 | Lalsangi et al. |
| 2015/0186270 A1 | 7/2015 | Peng et al. |
| 2015/0193338 A1 | 7/2015 | Sundaram et al. |
| 2015/0199415 A1 | 7/2015 | Bourbonnais et al. |
| 2015/0213032 A1 | 7/2015 | Powell et al. |
| 2015/0220402 A1 | 8/2015 | Cantwell et al. |
| 2015/0234709 A1 | 8/2015 | Koarashi |
| 2015/0236926 A1 | 8/2015 | Wright et al. |
| 2015/0242478 A1 | 8/2015 | Cantwell et al. |
| 2015/0244795 A1 | 8/2015 | Cantwell et al. |
| 2015/0253992 A1 | 9/2015 | Ishiguro et al. |
| 2015/0254013 A1 | 9/2015 | Chun |
| 2015/0261446 A1 | 9/2015 | Lee |
| 2015/0261792 A1 | 9/2015 | Attarde et al. |
| 2015/0269201 A1 | 9/2015 | Caso et al. |
| 2015/0286438 A1 | 10/2015 | Simionescu et al. |
| 2015/0288671 A1 | 10/2015 | Chan et al. |
| 2015/0293817 A1 | 10/2015 | Subramanian et al. |
| 2015/0301964 A1 | 10/2015 | Brinicombe et al. |
| 2015/0324236 A1 | 11/2015 | Gopalan et al. |
| 2015/0324264 A1 | 11/2015 | Chinnakkonda et al. |
| 2015/0339194 A1 | 11/2015 | Kalos et al. |

(56) References Cited

U.S. PATENT DOCUMENTS

| | | |
|---|---|---|
| 2015/0355985 A1 | 12/2015 | Holtz et al. |
| 2015/0363328 A1 | 12/2015 | Candelaria |
| 2015/0370715 A1 | 12/2015 | Samanta et al. |
| 2015/0378613 A1 | 12/2015 | Koseki |
| 2016/0004733 A1 | 1/2016 | Cao et al. |
| 2016/0011984 A1 | 1/2016 | Speer et al. |
| 2016/0026552 A1 | 1/2016 | Holden et al. |
| 2016/0034358 A1 | 2/2016 | Hayasaka et al. |
| 2016/0034550 A1 | 2/2016 | Ostler et al. |
| 2016/0048342 A1 | 2/2016 | Jia et al. |
| 2016/0070480 A1 | 3/2016 | Babu et al. |
| 2016/0070490 A1 | 3/2016 | Koarashi et al. |
| 2016/0070618 A1 | 3/2016 | Pundir et al. |
| 2016/0070644 A1 | 3/2016 | D'Sa et al. |
| 2016/0070714 A1 | 3/2016 | D'Sa et al. |
| 2016/0077744 A1 | 3/2016 | Pundir et al. |
| 2016/0092125 A1 | 3/2016 | Cowling et al. |
| 2016/0099844 A1 | 4/2016 | Colgrove et al. |
| 2016/0139838 A1 | 5/2016 | D'Sa et al. |
| 2016/0139849 A1 | 5/2016 | Chaw et al. |
| 2016/0149763 A1 | 5/2016 | Ingram et al. |
| 2016/0149766 A1 | 5/2016 | Borowiec et al. |
| 2016/0154834 A1 | 6/2016 | Friedman et al. |
| 2016/0179410 A1 | 6/2016 | Haas et al. |
| 2016/0188370 A1 | 6/2016 | Razin et al. |
| 2016/0188430 A1 | 6/2016 | Nitta et al. |
| 2016/0203043 A1 | 7/2016 | Nazari et al. |
| 2016/0283139 A1 | 9/2016 | Brooker et al. |
| 2016/0350192 A1 | 12/2016 | Doherty et al. |
| 2016/0371021 A1 | 12/2016 | Goldberg et al. |
| 2017/0003892 A1 | 1/2017 | Sekido et al. |
| 2017/0017413 A1 | 1/2017 | Aston et al. |
| 2017/0031769 A1 | 2/2017 | Zheng et al. |
| 2017/0031774 A1 | 2/2017 | Bolen et al. |
| 2017/0046257 A1 | 2/2017 | Babu et al. |
| 2017/0068599 A1 | 3/2017 | Chiu et al. |
| 2017/0083535 A1 | 3/2017 | Marchukov et al. |
| 2017/0097873 A1 | 4/2017 | Krishnamachari et al. |
| 2017/0109298 A1 | 4/2017 | Kurita et al. |
| 2017/0123726 A1 | 5/2017 | Sinclair et al. |
| 2017/0212690 A1 | 7/2017 | Babu et al. |
| 2017/0220777 A1 | 8/2017 | Wang et al. |
| 2017/0300248 A1 | 10/2017 | Purohit et al. |
| 2017/0351543 A1 | 12/2017 | Kimura |
| 2018/0081832 A1 | 3/2018 | Longo et al. |
| 2018/0287951 A1 | 10/2018 | Waskiewicz, Jr. et al. |

FOREIGN PATENT DOCUMENTS

| | | |
|---|---|---|
| EP | 2693358 A1 | 2/2014 |
| EP | 2735978 A1 | 5/2014 |
| WO | 2006050455 A2 | 5/2006 |
| WO | 2012132943 A1 | 10/2012 |
| WO | 2013101947 A1 | 7/2013 |

OTHER PUBLICATIONS

Non-Final Office Action received for U.S. Appl. No. 14/186,847 dated Aug. 13, 2015, 23 pages.

Final Office Action on U.S. Appl. No. 14/186,847 dated Feb. 16, 2016.

Lamport L., "The Part-Time Parliament," ACM Transactions on Computer Systems, May 1998, vol. 16 (2), pp. 133-169.

Leventhal A.H., "A File System All its Own," Communications of the ACM Queue, May 2013, vol. 56 (5), pp. 64-67.

Lim H., et al., "SILT: A Memory-Efficient, High-Performance Key-Value Store," Proceedings of the 23rd ACM Symposium on Operating Systems Principles (SOSP'11), Oct. 23-26, 2011, pp. 1-13.

Metreveli et al. "CPHash: A Cache-Partitioned Hash Table." Nov. 2011. https://people.csail.mit.edu/nickolai/papers/metrevelicphash-tr.pdf.

Moshayedi M., et al., "Enterprise SSDs," ACM Queue—Enterprise Flash Storage, Jul.-Aug. 2008, vol. 6 (4), pp. 32-39.

Odlevak, "Simple Kexec Example", https://www.linux.com/blog/simple-kexec-example, accessed on Feb. 5, 2019 (Year: 2011), 4 pages.

Oetiker, "rrdfetch," http ://oss.oetiker.ch/rrdtool/doc/rrdfetch .en. html, Date obtained from the internet: Sep. 9, 2014, 5 pages.

Oetiker, "rrdtool," http :/loss. oetiker.ch/rrdtool/doc/rrdtool.en. html Date obtained from the internet: Sep. 9, 2014, 5 pages.

O'Neil P., at al., "The Log-structured Merge-tree (lsm-tree)," Acta Informatica, 33, 1996, pp. 351-385.

Ongaro D., et al., "In Search of an Understandable Consensus Algorithm," Stanford University, URL: https://ramcloud.stanford.edu/wiki/download/attachments/11370504/raft.pdf, May 2013, 14 pages.

Ongaro, et al., "In search of an understandable consensus algorithm (extended version)," 2014, 18 pages.

Pagh R., etaL, "Cuckoo Hashing," Elsevier Science, Dec. 8, 2003, pp. 1-27.

Pagh R., et al., "Cuckoo Hashing for Undergraduates," IT University of Copenhagen, Mar. 27, 2006, pp. 1-6.

"Pivot Root", Die.net, retrieved from https://linux.die.net/pivot_root on Nov. 12, 2011 (Year: 2012).

Proceedings of the FAST 2002 Conference on File Storage Technologies, Monterey, California, USA, Jan. 28-30, 2002, 14 pages.

Rosenblum M., et al., "The Design and Implementation of a Log-Structured File System," In Proceedings of ACM Transactions on Computer Systems, vol. 10(1),Feb. 1992, pp. 26-52.

Rosenblum M., et al., "The Design and Implementation of a Log-Structured File System," (SUN00006867-SUN00006881), Jul. 1991, 15 pages.

Rosenblum M., et al., "The Design and Implementation of a Log-Structured File System,"Proceedings of the 13th ACM Symposium on Operating Systems Principles, (SUN00007382-SUN00007396), Jul. 1991, 15 pages.

Rosenblum M., et al., "The LFS Storage Manager," USENIX Technical Conference, Anaheim, CA, (Sun 00007397-SUN00007412), Jun. 1990, 16 pages.

Rosenblum M., et al., "The LFS Storage Manager," USENIX Technical Conference, Computer Science Division, Electrical Engin, and Computer Sciences, Anaheim, CA, presented at Summer '90 USENIX Technical Conference, (SUN00006851-SUN00006866), Jun. 1990, 16 pages.

Rosenblum M., "The Design and Implementation of a Log-Structured File System," UC Berkeley, 1992, pp. 1-101.

Sears., et al., "Blsm: A General Purpose Log Structured Merge Tree," Proceedings of the 2012 ACM SIGMOD International Conference on Management, 2012, 12 pages.

Seltzer M., et al., "An Implementation of a Log Structured File System for UNIX," Winter USENIX, San Diego, CA, Jan. 25-29, 1993, pp. 1-18.

Seltzer M.I., et al., "File System Performance and Transaction Support," University of California at Berkeley Dissertation, 1992, 131 pages.

Smith K., "Garbage Collection," Sand Force, Flash Memory Summit, Santa Clara, CA, Aug. 2011, pp. 1-9.

Stoica et al. "Chord: A Scalable Peer-to-peer Lookup Service for Internet Applications." Aug. 2001. ACM. SIGCOMM 01.

Supplementary European Search Report for Application No. EP12863372 dated Jul. 16, 2015, 7 pages.

Texas Instruments, User Guide, TMS320C674x/OMAP-L1 x Processor Serial ATA (SATA) Controller, Mar. 2011, 76 Pages.

Twigg A., et al., "Stratified B-trees and Versioned Dictionaries," Proceedings of the 3rd US EN IX Conference on Hot Topics in Storage and File Systems, 2011, vol. 11, pp. 1-5.

Waskiewicz, PJ, "Scaling With Multiple Network Namespaces in a Single Application", Netdev 1.2—The Technical Conferenceon Linux Networking, retrieved from internet: URL; https://netdevconf.orq/1.2/papers/pj-netdev-1.2pdf Dec. 12, 2016, 5 pages.

Wei, Y. and D. Shin, "NAND Flash Storage Device Performance in Linux File System," 6th International Conference on Computer Sciences and Convergence Information Technology (ICCIT), 2011.

(56) References Cited

OTHER PUBLICATIONS

Wikipedia, "Cuckoo hashing," http://en.wikipedia.org/wiki/Cuckoo_hash, Apr. 2013, pp. 1-5.
Wilkes J., et al., "The Hp Auto Raid Hierarchical Storage System," Operating System Review, ACM, New York, NY, Dec. 1, 1995, vol. 29 (5), pp. 96-108.
Wu P-L., et al., "A File-System-Aware FTL Design for Flash-Memory Storage Systems," IEEE, Design, Automation & Test in Europe Conference & Exhibition, 2009, pp. 1-6.
Yossef, "BuildingMurphy-compatible embedded Linux Systems", Proceedings of the Linux Symposium,Ottawa, Ontario Canada, Jul. 20-23, 2005 (Year: 2005).
Agrawal, et al., "Design Tradeoffs for SSD Performance," USENIX Annual Technical Conference, 2008, 14 Pages.
Alvaraez C., "NetApp Deduplication for FAS and V-Series Deployment and Implementation Guide," Technical Report TR-3505, 2011, 75 pages.
Amit et al., "Strategies for Mitigating the IOTLB Bottleneck," Technion—Israel Institute of Technology, IBM Research Haifa, WIOSCA 2010—Sixth Annual Workshop on the Interaction between Operating Systems and Computer Architecture, 2010, 12 pages.
Arpaci-Dusseau R., et al., "Log-Structured File Systems," Operating Systems: Three Easy Pieces published by Arpaci-Dusseau Books, May 25, 2014, 15 pages.
Balakrishnan M., et al., "CORFU: A Shared Log Design for Flash Clusters," Microsoft Research Silicon Vally, University of California, San Diego, Apr. 2012, https://www.usenix.org/conference/nsdi12/technical-sessions/presentation/balakrishnan, 14 pages.
Ben-Yehuda et al., "The Price of Safety: Evaluating IOMMU Performance," Proceedings of the Linux Symposium, vol. 1, Jun. 27-30, 2007, pp. 9-20.
Bitton D. et al., "Duplicate Record Elimination in Large Data Files," Oct. 26, 1999, 11 pages.
Bogaerdt, "cdeftutorial," http://oss.oetiker.ch/rrdtool/tut/cdeftutorial.en.html Date obtained from the internet, Sep. 9, 2014, 14 pages.
Bogaerdt, "Rates, Normalizing and Consolidating," http://www.vandenbogaerdl.nl/rrdtool/process.php Date obtained from the internet: Sep. 9, 2014, 5 pages.
Bogaerdt, "rrdtutorial," http://oss.oetiker.ch/rrdtool/lul/rrdtutorial.en.html Date obtained from the internet, Sep. 9, 2014, 21 pages.
Chris K., et al., "How many primes are there?" Nov. 2001. https://web.archive.org/web/20011120073053/http://primes.utm edu/howmany shtml.
Cornwellm., "Anatomy of a Solid-state Drive," ACM Queue-Networks, Oct. 2012, vol. 10 (10), pp. 1-7.
Culik K., et al., "Dense Multiway Trees," ACM Transactions on Database Systems, Sep. 1981, vol. 6 (3), pp. 486-512.
Debnath B., et al., "FlashStore: High Throughput Persistent Key-Value Store," Proceedings of the VLDB Endowment VLDB Endowment, Sep. 2010, vol. 3 (1-2), pp. 1414-1425.
Debnath, et al., "ChunkStash: Speeding up In line Storage Deduplication using Flash Memory," USENIX, USENIXATC '10, Jun. 2010, 15 pages.
Dictionary definition for references, retrieved from: http://www.dictionary.com/browse/reference?s=t on Dec. 23, 2017.
Enclopedia entry for pointers vs. references, retrieved from: https://www.geeksforgeeks.org/pointers-vs-references-cpp/ on Dec. 23, 2017.
Extended European Search Report dated Apr. 9, 2018 for EP Application No. 15855480.8 filed Oct. 22, 2015, 7 pages.
Fan, et al., "MemC3: Compact and Concurrent MemCache with Dumber Caching and Smarter Hashing," USENIX NSDI '13, Apr. 2013, pp. 371-384.
Gal E., et al., "Algorithms and Data Structures for Flash Memories," ACM Computing Surveys (CSUR) Archive, Publisher ACM, New York City, NY, USA, Jun. 2005, vol. 37 (2), pp. 138-163.
Gray J., et al., "Flash Disk Opportunity for Server Applications," Queue—Enterprise Flash Storage, Jul.-Aug. 2008, vol. 6 (4), pp. 18-23.
Gulati et al., "BASIL: Automated IO Load Balancing Across Storage Devices," Proceedings of the 8th USENIX Conference on File and Storage Technologies, FAST'10, Berkeley, CA, USA, 2010, 14 pages.
Handy J., "SSSI Tech Notes: How Controllers Maximize SSD Life," SNIA, Jan. 2013, pp. 1-20.
Hwang K., et al., "RAID-x: A New Distributed Disk Array for I/O-centric Cluster Computing," IEEE High-Performance Distributed Computing, Aug. 2000, pp. 279-286.
IBM Technical Disclosure Bulletin, "Optical Disk Axial Runout Test", vol. 36, No. 10, NN9310227, Oct. 1, 1993, 3 pages.
Intel, Product Specification—Intel® Solid-State Drive DC S3700, Jun. 2013, 32 pages.
International Search Report and Written Opinion for Application No. PCT/EP2014/071446 dated Apr. 1, 2015, 14 pages.
International Search Report and Written Opinion for Application No. PCT/US2012/071844 dated Mar. 1, 2013, 12 pages.
International Search Report and Written Opinion for Application No. PCT/US2014/035284 dated Apr. 1, 2015, 8 pages.
International Search Report and Written Opinion for Application No. PCT/US2014/055138 dated Dec. 12, 2014, 13 pages.
International Search Report and Written Opinion for Application No. PCT/US2014/058728 dated Dec. 16, 2014, 11 pages.
International Search Report and Written Opinion for Application No. PCT/US2014/060031 dated Jan. 26, 2015, 9 pages.
International Search Report and Written Opinion for Application No. PCT/US2014/071446 dated Apr. 1, 2015, 13 pages.
International Search Report and Written Opinion for Application No. PCT/US2014/071465 dated Mar. 25, 2015, 12 pages.
International Search Report and Written Opinion for Application No. PCT/US2014/071484 dated Mar. 25, 2015, 9 pages.
International Search Report and Written Opinion for Application No. PCT/US2014/071581 dated Apr. 10, 2015, 9 pages.
International Search Report and Written Opinion for Application No. PCT/US2014/071635 dated Mar. 31, 2015, 13 pages.
International Search Report and Written Opinion for Application No. PCT/US2015/021285 dated Jun. 23, 2015, 8 pages.
International Search Report and Written Opinion for Application No. PCT/US2015/024067 dated Jul. 8, 2015, 7 pages.
International Search Report and Written Opinion for Application No. PCT/US2015/048800 dated Nov. 25, 2015, 11 pages.
International Search Report and Written Opinion for Application No. PCT/US2015/048810 dated Dec. 23, 2015, 11 pages.
International Search Report and Written Opinion for Application No. PCT/US2015/048833 dated Nov. 25, 2015, 11 pages.
International Search Report and Written Opinion for Application No. PCT/US2015/056932 dated Jan. 21, 2016, 11 pages.
International Search Report and Written Opinion for Application No. PCT/US2015/057532 dated Feb. 9, 2016, 12 pages.
International Search Report and Written Opinion for Application No. PCT/US2016/059943 dated May 15, 2017, 14 pages.
International Search Report and Written Opinion for Application No. PCT/US2018/025951, dated Jul. 18, 2018, 16 pages.
Jones, M. Tim, "Next-generation Linux file systems: NiLFS(2) and eofs," IBM, 2009.
Jude Nelson "Syndicate: Building a Virtual Cloud Storage Service Through Service Composition" Princeton University, 2013, pp. 1-14.
Kagel A.S, "two-way merge sort," Dictionary of Algorithms and Data Structures [online], retrieved on Jan. 28, 2015, Retrieved from the Internet: URL: http://xlinux.nist.gov/dads/HTMUIwowaymrgsrl.html, May 2005, 1 page.
Konishi, R., Sato, K., andY. Amagai, "Filesystem Support for Continuous Snapshotting," Ottawa Linux Symposium, 2007.
Extended European Search Report for Application No. 20201330.6 dated Dec. 8, 2020, 7 pages.
Extended European Search Report for Application No. 20205866.5 dated Dec. 8, 2020, 7 pages.

\* cited by examiner

DATA SYNCING IN A DISTRIBUTED SYSTEM

CROSS-REFERENCE TO RELATED APPLICATIONS

The present application is a continuation of U.S. patent application Ser. No. 14/684,929, filed Apr. 13, 2015, now U.S. Pat. No. 10,628,443, which is a continuation of U.S. patent application Ser. No. 14/186,847, filed Feb. 21, 2014, now abandoned, the entire contents of which are incorporated herein by reference in their entirety.

BACKGROUND

The following description is provided to assist the understanding of the reader. None of the information provided is admitted to be prior art.

In data storage architectures, a client's data may be stored in a volume. A unit of data, for example a file (or object), is comprised of one or more storage units (e.g. bytes) and can be stored and retrieved from a storage medium such as disk or RAM in a variety of fashions. For example, disk drives in storage systems are divided into logical blocks that are addressed using logical block addresses (LBAs). As another example, an entire file can be stored in a contiguous range of addresses on the storage medium and be accessed given the offset and length of the file. Most modern file systems store files by dividing them into blocks or extents of a fixed size, storing each block in a contiguous section of the storage medium, and then maintaining a list or tree of the blocks that correspond to each file. Some storage systems, such as write-anywhere file layout (WAFL), logical volume manager (LVM), or new technology file system (NTFS), allow multiple objects to refer to the same blocks, typically through a tree structure, to allow for efficient storage of previous versions or "snapshots" of the file system. In some cases, data for a single file or object may be distributed between multiple storage devices, either by a mechanism like RAID which combines several smaller storage media into one larger virtual device, or through a distributed storage system such as Lustre, General Parallel File System, or GlusterFS.

At some point, it is desirable to backup data of the storage system. Traditional backup methods typically utilize backup software that operates independently of the data storage system and manages the backup process. Backup methods exist to backup only the differences since the last full backup (e.g., a differential backup) or to backup only the changes since the last backup (e.g., an incremental backup). However, due to inefficiency of backup software, many administrators are shifting away from traditional backup processes and moving towards data replication methods. With replication comes the issue of replicating a mistake, for example, a wrongly deleted file. High bandwidth is required for both replication and backup solutions, and neither methods are particularly well suited to scale efficiently for long term archiving.

BRIEF DESCRIPTION OF THE DRAWINGS

The foregoing and other features of the present disclosure will become more fully apparent from the following description and appended claims, taken in conjunction with the accompanying drawings.

DETAILED DESCRIPTION OF EXAMPLE EMBODIMENTS

Overview

In general, one innovative aspect of the subject matter described below can be embodied in methods for receiving a start replication message from a source system to replicate data of a source volume to a replicated volume on a replica server. The replicated volume comprises a copy of data of the source volume. The source system forwards input/output (I/O) requests to the replica server after the start replication message is sent. A data structure associated with units of data of the replicated volume is initialized. A write request is received from the source system that includes write data associated a unit of data of the replicated volume. The source system wrote the write data to the source volume based upon the write request. The write data is written to the replicated volume. The data structure is updated to indicate the write data has been written after the receipt of the start replication message. Source metadata associated with the source volume is received. The metadata includes an ordered list of block identifiers for data blocks of the source volume. Each block identifier is used to access a data block. The source metadata is compared with prior metadata associated with a prior point-in-time image of the source volume to determine blocks of data that have changed since the prior point-in-time image of the source volume. A first block of the blocks of data is determined to not be retrieved based upon the data structure. A second block of the blocks of data is determined to be retrieved based upon the data structure. The second block is received from the source system and written to the replicated volume. Other embodiments of this aspect include corresponding systems, apparatuses, and computer-readable media, configured to perform the actions of the method.

The foregoing summary is illustrative only and is not intended to be in any way limiting. In addition to the illustrative aspects, implementations, and features described above, further aspects, implementations, and features will become apparent by reference to the following drawings and the detailed description.

DETAILED DESCRIPTION

Described herein are techniques for an incremental block level backup system. In the following description, for purposes of explanation, numerous examples and specific details are set forth in order to provide a thorough understanding of various implementations. Particular implementations as defined by the claims may include some or all of the features in these examples alone or in combination with other features described below, and may further include modifications and equivalents of the features and concepts described herein.

Storage System

Figure 1:
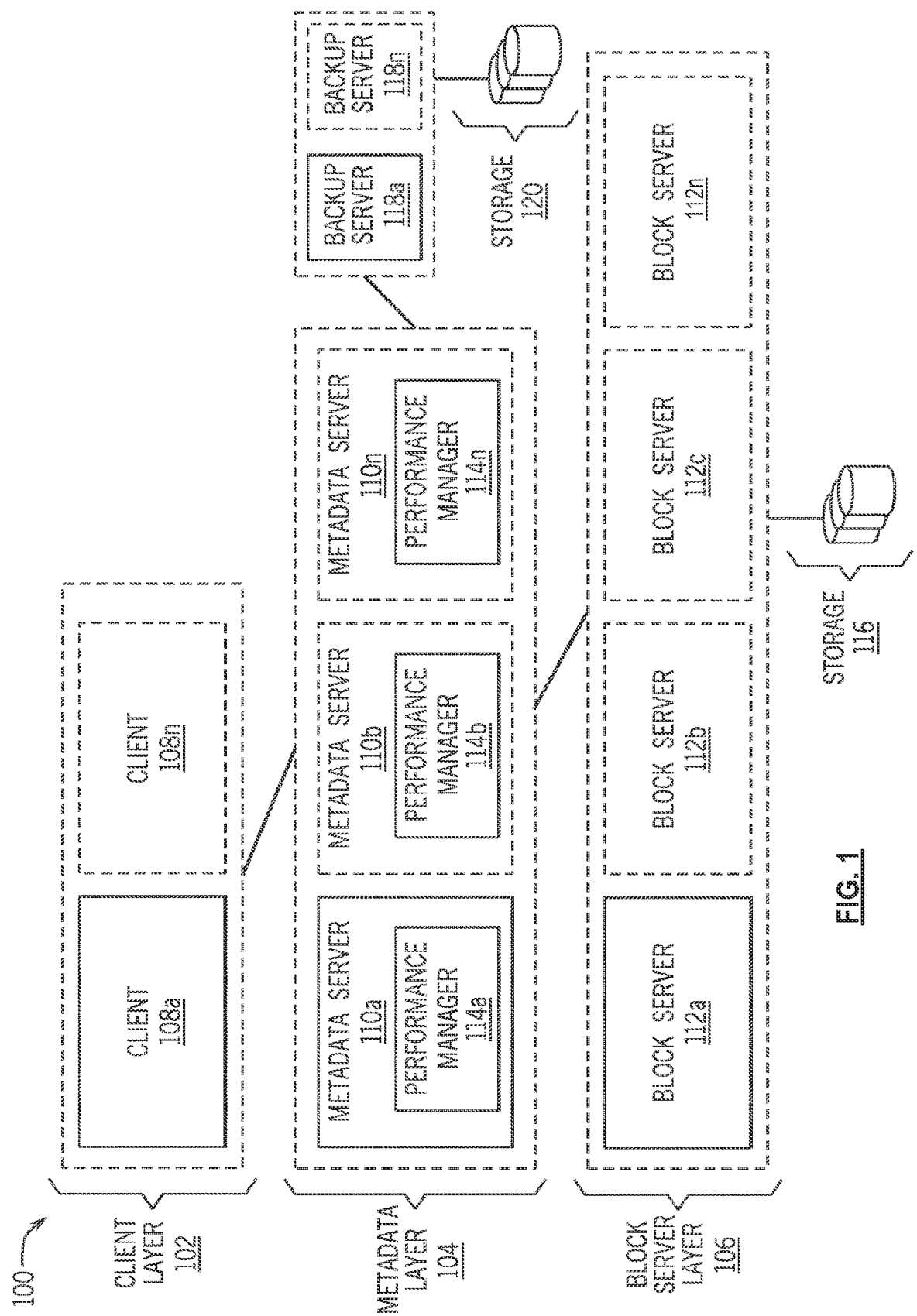
FIG. 1 depicts a simplified system for a storage system in accordance with an illustrative implementation.

FIG. 1 depicts a simplified system for incremental block level backup of a storage system 100 in accordance with an illustrative implementation. System 100 includes a client layer 102, a metadata layer 104, a block server layer 106, storage 116, and storage 120.

In general, client layer 102 includes one or more clients 108a-108n. Clients 108 include client processes that may exist on one or more physical machines. When the term "client" is used in the disclosure, the action being performed may be performed by a client process. A client process is responsible for storing, retrieving, and deleting data in system 100. A client process may address pieces of data depending on the nature of the storage system and the format of the data stored. For example, the client process may reference data using a client address. The client address may take different forms. For example, in a storage system that uses file storage, client 108 may reference a particular volume or partition, and a file name. With object storage, the client address may be a unique object name. For block storage, the client address may be a volume or partition, and a block address. Clients 108 communicate with metadata layer 104 using different protocols, such as small computer system interface (SCSI), Internet small computer system interface (ISCSI), fibre channel (FC), common Internet file system (CIFS), network file system (NFS), hypertext transfer protocol (HTTP), hypertext transfer protocol secure (HTTPS), web-based distributed authoring and versioning (WebDAV), or a custom protocol.

Metadata layer 104 includes one or more metadata servers 110a-110n. Performance managers 114 may be located on metadata servers 110a-110n. Block server layer 106 includes one or more block servers 112a-112n. Block servers 112a-112n are coupled to storage 116, which stores volume data for clients 108. Each client 108 may be associated with a volume. In one implementation, only one client 108 accesses data in a volume; however, multiple clients 108 may access data in a single volume.

Storage 116 can include multiple solid state drives (SSDs). In one implementation, storage 116 can be a cluster of individual drives coupled together via a network. When the term "cluster" is used, it will be recognized that cluster may represent a storage system that includes multiple disks that may not be networked together. In one implementation, storage 116 uses solid state memory to store persistent data. SSDs use microchips that store data in non-volatile memory chips and contain no moving parts. One consequence of this is that SSDs allow random access to data in different drives in an optimized manner as compared to drives with spinning disks. Read or write requests to non-sequential portions of SSDs can be performed in a comparable amount of time as compared to sequential read or write requests. In contrast, if spinning disks were used, random read/writes would not be efficient since inserting a read/write head at various random locations to read data results in slower data access than if the data is read from sequential locations. Accordingly, using electromechanical disk storage can require that a client's volume of data be concentrated in a small relatively sequential portion of the cluster to avoid slower data access to non-sequential data. Using SSDs removes this limitation.

In various implementations, non-sequentially storing data in storage 116 is based upon breaking data up into one more storage units, e.g., data blocks. A data block, therefore, is the raw data for a volume and may be the smallest addressable unit of data. The metadata layer 104 or the client layer 102 can break data into data blocks. The data blocks can then be stored on multiple block servers 112. Data blocks can be of a fixed size, can be initially a fixed size but compressed, or can be of a variable size. Data blocks can also be segmented based on the contextual content of the block. For example, data of a particular type may have a larger data block size compared to other types of data. Maintaining segmentation of the blocks on a write (and corresponding re-assembly on a read) may occur in client layer 102 and/or metadata layer 104. Also, compression may occur in client layer 102, metadata layer 104, and/or block server layer 106.

In addition to storing data non-sequentially, data blocks can be stored to achieve substantially even distribution across the storage system. In various examples, even distribution can be based upon a unique block identifier. A block identifier can be an identifier that is determined based on the content of the data block, such as by a hash of the content. The block identifier is unique to that block of data. For example, blocks with the same content have the same block identifier, but blocks with different content have different block identifiers. To achieve even distribution, the values of possible unique identifiers can have a uniform distribution. Accordingly, storing data blocks based upon the unique identifier, or a portion of the unique identifier, results in the data being stored substantially evenly across drives in the cluster.

Because client data, e.g., a volume associated with the client, is spread evenly across all of the drives in the cluster, every drive in the cluster is involved in the read and write paths of each volume. This configuration balances the data and load across all of the drives. This arrangement also removes hot spots within the cluster, which can occur when client's data is stored sequentially on any volume.

In addition, having data spread evenly across drives in the cluster allows a consistent total aggregate performance of a cluster to be defined and achieved. This aggregation can be achieved, since data for each client is spread evenly through the drives. Accordingly, a client's I/O will involve all the drives in the cluster. Since, all clients have their data spread substantially evenly through all the drives in the storage system, a performance of the system can be described in aggregate as a single number, e.g., the sum of performance of all the drives in the storage system.

Block servers 112 and slice servers maintain a mapping between a block identifier and the location of the data block in a storage medium of block server 112. A volume includes these unique and uniformly random identifiers, and so a volume's data is also evenly distributed throughout the cluster.

Metadata layer 104 stores metadata that maps between client layer 102 and block server layer 106. For example, metadata servers 110 map between the client addressing used by clients 108 (e.g., file names, object names, block numbers, etc.) and block layer addressing (e.g., block identifiers) used in block server layer 106. Clients 108 may perform access based on client addresses. However, as described above, block servers 112 store data based upon identifiers and do not store data based on client addresses. Accordingly, a client can access data using a client address which is eventually translated into the corresponding unique identifiers that reference the client's data in storage 116.

Although the parts of system 100 are shown as being logically separate, entities may be combined in different fashions. For example, the functions of any of the layers may be combined into a single process or single machine (e.g., a computing device) and multiple functions or all functions may exist on one machine or across multiple machines. Also, when operating across multiple machines, the machines may communicate using a network interface, such as a local area network (LAN) or a wide area network (WAN). In one implementation, one or more metadata servers 110 may be combined with one or more block servers 112 or backup servers 118 in a single machine. Entities in system 100 may be virtualized entities. For example, multiple virtual block servers 112 may be included on a machine. Entities may also be included in a cluster, where computing resources of the cluster are virtualized such that the computing resources appear as a single entity.

Block Level Incremental Backup

One or more backup servers 118a-118n can interface with the metadata layer 104. Backup servers 118 can interface directly with block servers 112. Backup servers 118a-118n are coupled to storage 120, which stores backups of volume data for clients 108. Storage 120 can include multiple hard disk drives (HDDs), solid state drives (SSDs), hybrid drives, or other storage drives. In one implementation, storage 120 can be a cluster of individual drives coupled together via a network. Backup servers 118 can store backup copies of the data blocks of storage 116 according to any number of formats in storage 120, and translation from the format of the data blocks of storage 116 may occur. Data may be transferred to and from backup servers 118 using different protocols, such as small computer system interface (SCSI), Internet small computer system interface (ISCSI), fibre channel (FC), common Internet file system (CIFS), network file system (NFS), hypertext transfer protocol (HTTP), hypertext transfer protocol secure (HTTPS), web-based distributed authoring and versioning (WebDAV), or a custom protocol. Compression and data de-duplication may occur in backup servers 118a-118n.

As discussed above, the servers of metadata layer 104 store and maintain metadata that maps between client layer 102 and block server layer 106, where the metadata maps between the client addressing used by clients 108 (e.g., file names, volume, object names, block numbers, etc.) and block layer addressing (e.g., block identifiers) used in block server layer 106. In one embodiment, the metadata includes a list of block identifiers that identifies blocks in a volume. The list may be structured as an ordered list corresponding to a list of blocks. The list may also be structured as the leaves of a hash tree. The block identifiers of the metadata are the same block identifiers as used throughout system 100 as described above. The block identifiers may be hexadecimal numbers, but other representations may be used. Additional metadata may also be included, such as inode numbers, directory pointers, modification dates, file size, client addresses, list details, etc. The block identifiers uniquely identify the data of a block and are a hash based on the content of the data block. Backup servers 118 are generally configured to create backups of block level data of a volume that is stored in storage 116 of block server layer 106. Backup servers 118 may create backups of all of the volume data of block server layer 106 or backup servers 118 may create backups of one or more particular volumes (e.g., a volume of a client 108). Backups may be full backups of all data, or they may be incremental backups (e.g., data that has changed since a previous backup).

During an initial backup operation, a backup server 118 retrieves a copy of metadata from metadata server 110 for a client volume. The metadata includes a list of block identifiers associated with data blocks of the volume. In an implementation, the metadata includes an ordered list structure of block identifiers. In another implementation, the ordered list is structured as the leaves of a hash tree (e.g., a Merkle tree, etc.) and the metadata includes the hash tree. The metadata is used by backup server 118 to retrieve a copy of all of the data blocks of the client volume in order to create an initial backup of the data blocks. The data blocks are retrieved from storage 116 by sending a request for the data to a metadata server 110. The requested data is based on the data block identifiers. A request may include a list of the block identifiers of blocks desired to be backed up. In one implementation, backup server 118 may calculate the LBAs of blocks desired to be backed up. For example, because each block identifier can represent a known amount of data (e.g., a 4 k block, etc.), an LBA of a block can be calculated based on the location of the block identifier in the ordered list of block identifiers associated with the volume. For example, the position of a block identifier in the ordered list can be used along with the block size to determine the LBA of the data block. As described below, the tree structure can also be used to determine the data blocks that have changed after a previous backup. In this example, the number of leaf nodes to the left of a changed leaf node can be used to calculate the LBA of the data block. In implementations where LBAs are calculated, a request from backup server 118 may include a list of LBAs of blocks to be backed up. The metadata server 110 routes the request to a block server 112, which provides the requested data to metadata server 110. Metadata server 110 then routes the requested data to the backup server 118. This arrangement allows the servers of metadata layer 104 to facilitate data transmission between block server layer 106 and the backup servers 118. In another implementation, backup servers 118 may be configured to communicate directly with servers of block server layer 106. Upon retrieval of the requested data, the backup server 118 stores the data in storage 120. The data may be stored in storage 120 according to any of the methods discussed herein. Backup server 118 may create and maintain statistics and snapshot data corresponding to a particular backup operation. The snapshot data may be used later during a data restoration operation, or during a future backup operation. Backup server 118 can also store a copy of the metadata used during a particular backup operation. In another embodiment, the metadata is not stored on the backup server 118. Rather, the metadata is stored on another storage device, for example, one or more metadata servers, one or more block servers, or one or more devices remote from the backup system. As a result of the initial backup operation, a complete backup of the data of a client volume is created and stored in storage 120.

During an incremental backup operation, a backup server 118 retrieves the current metadata from metadata server 110 for a client volume. The backup server 118 can then compare the current metadata from metadata server 110 with a version of stored metadata on backup server 118 (e.g., the version of metadata stored during the most recent backup operation, or the initial version of the metadata stored during the initial backup, etc.). In an implementation where the metadata includes an ordered list of block identifiers, the backup server 118 can compare the block identifiers of the two versions of metadata node-by-node. For example, the current list node corresponding to a first block of data is compared to the stored list node corresponding to the first block of data, and each node of the ordered list is traversed and compared. Since the block identifiers are hashes based on content of a corresponding data block, a difference in hash values for corresponding nodes indicates that the data of the block has been changed/updated since the prior backup. As the block identifiers are integral to storage system 100 and maintained as described herein, the block identifiers can be compared in their native format and immediately used without the need to compute the hash values. In an implementation where the metadata includes a hash tree and the ordered list of block identifiers are structured as the leaves of the hash tree, additional performance gains may be realized. Such a hash tree is generally a tree data structure in which every non-leaf node includes the hash of its children nodes. This structure is particularly useful because it allows efficient determination of which data blocks have been updated since a prior backup, without the need to compare every node of the list of block identifiers. The determination of changed data blocks by using a hash tree will be discussed in further detail below with reference to FIGS. 2a-b. Upon determination of which particular blocks of data have changed since the previous backup, backup server 118 can retrieve the updated blocks of data from storage 116 by sending a request for the changed data block to the metadata server 110. As discussed above, the metadata server 110 can facilitate the transfer of data from the block server layer 106. Upon retrieval of the requested changed data blocks, the backup server 118 stores the data in storage 120. The backup server 118 also stores the current metadata from metadata server 110 used in the incremental backup operation. As a result of the incremental backup operation, only the data of a volume that has changed since a previous backup operation is backed up again. This provides a number of advantages, including increasing the efficiency of the data backup procedure, and decreasing the overall amount of data being transferred during the backup procedure. Further, any number of incremental backup operations may be performed, during which the current metadata from metadata server 110 may be compared to previously stored metadata on backup server 118 (e.g., the stored metadata from a prior backup operation).

Backup servers 118 may also provide an application programming interface (API) in order to allow clients 108 or traditional data backup software to interface with the backup systems described herein. For example, the API may allow backup servers 118 to send statistics related to backed up data and backup operations to and from clients 108 or traditional backup software. As another example, the API may allow backup servers 118 to receive a request to initiate a backup operation. The API can also allow for backup operations to be scheduled as desired by clients 108 or as controlled by data backup software. Other API functionality is also envisioned.

Figure 2A:
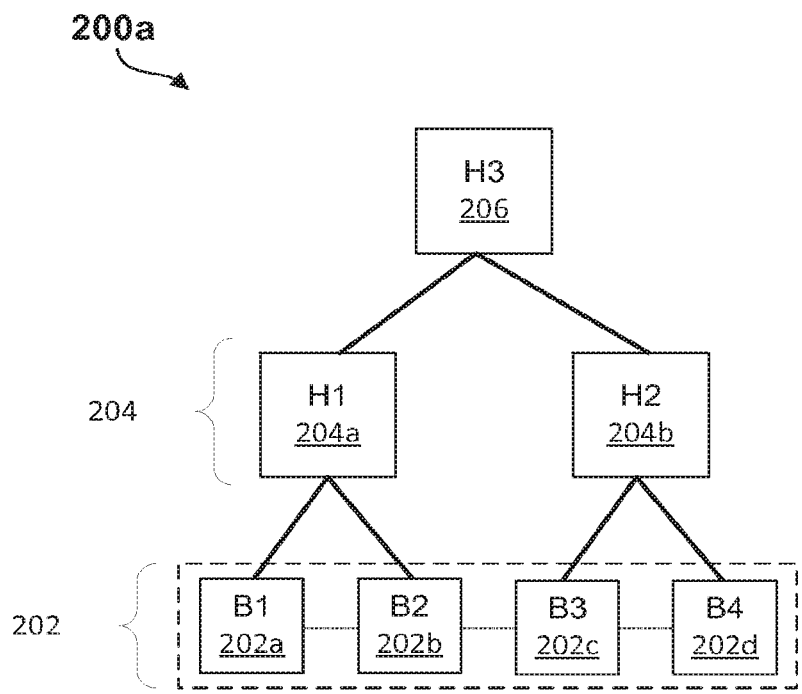
FIG. 2A depicts a hash tree in accordance with an illustrative implementation.

Referring to FIG. 2A, a hash tree 200a is shown in accordance with an illustrative implementation. The hash tree 200a may be a hash tree that is provided by a metadata server 110 to a backup server 118 in an initial or incremental backup operation as discussed above. Although depicted as a binary hash tree, hash tree 200a (and hash trees described herein) may have any number of child nodes/branches. Hash tree 200a represents the data of a particular volume, and can be provided along with additional metadata describing details related to the tree structure. For example, the metadata may include statistics regarding node counts, leaf-node counts, tree-depth, indexes to sub-trees, etc. Backup server 118 may store the additional metadata for future use. Hash tree 200a includes leaves 202a-d, internal nodes 204a-b, and root node 206. Leaves 202a-d store block identifies B1-B4, respectively. In an implementation, leaves 202a-d may be structured as an ordered list that is indexed by its parent nodes, which in this example are internal nodes 204. Block identifiers B1-B4 are identifiers as described herein (e.g., a hash of the corresponding data block's content), and each uniquely identify a particular data block of the volume. Hash tree 200a further includes non-leaf internal nodes 204a-b and non-leaf root node 206. The value stored by each non-leaf node is the hash of that node's children values. For example, hash H1 is the hash of block identifiers B1 and B2, hash H2 is the hash of block identifiers B3 and B4, and hash H3 is the hash of hashes H1 and H2. During an initial backup operation, backup server 118 can walk the tree, or traverse the ordered list of leaves 202a-d to determine that the data blocks corresponding to block identifiers B1-B4 should be retrieved to be backed up. A copy of hash tree 200a (and any accompanying metadata) is stored by backup server 118 when a backup operation is performed.

Figure 2B:
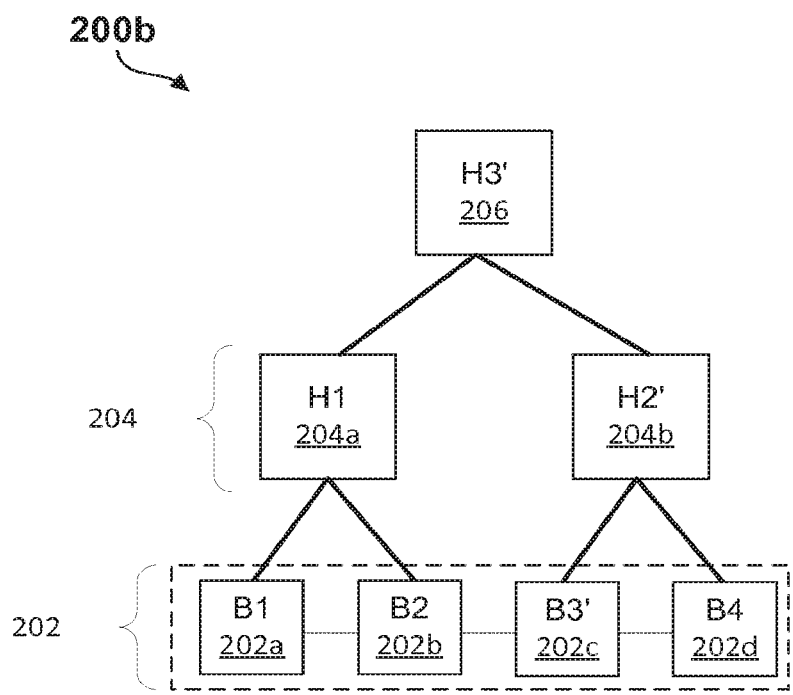
FIG. 2B depicts the hash tree illustrated in FIG. 2A, with updated node hashes, in accordance with an illustrative implementation.

Referring to FIG. 2B, the hash tree 200a of FIG. 2A is shown at a later time instance, as hash tree 200b. For example, hash tree 200a may have been provided by metadata server 110 during an initial backup operation and stored by the backup server 118, and hash tree 200b may have been provided by metadata server 110 during a subsequent incremental backup operation. Both hash trees 200a-b represent the data stored on a particular volume. As depicted, the block identifier B3 of leaf node 202c has changed to become block identifier B3' at some time since the previous backup. For example, new or updated data may have been written to the block referenced by block identifier B3. Because of the structure of the hash tree, the change of block identifier from B3 to B3' causes updates in hashes to propagate upward through the parent node to the root node. Specifically, hash H2 is recalculated to become H2', and hash H3 is recalculated to become to H3'. During a backup operation, backup server 118 may walk the hash tree 200b, and compare the nodes of hash tree 200b to corresponding nodes of hash tree 200a. A difference between corresponding non-leaf node hashes indicates that a block identifier (and therefore block data) below that non-leaf node has changed. If the hashes of corresponding non-leaf nodes are equal, this indicates that the block identifiers below that non-leaf node have not changed (and therefore corresponding block data has also not changed). Thus, the subtree of nodes below an unchanged non-leaf node can be skipped from further processing. In this manner, a performance increase may be realized as the entire hash tree does not need to be traversed in every backup operation. As an example with reference to FIG. 2B, backup server 118 may compare hash tree 200b to hash tree 200a as follows (although analysis performed by backup server 118 is not limited to the following operations or order of operations):

1. Node 206 is analyzed to determine that hash H3' is different from its previous value of H3, and therefore hash trees 200a-b need to be further analyzed.
2. Node 204a is analyzed to determine that hash H1 has not changed, and the subtree of node 204a (leaf nodes 202a-b) may be skipped from further analysis.
3. Node 204b is analyzed to determine that hash H2' is different from its previous value of H2, therefore the subtree of node 204b (leaf nodes 202c-d) must be analyzed.
4. Leaf node 202c is analyzed to determine that block identifier B3' is different from its previous value of B3. Thus, the data block corresponding to block identifier B3' needs to be backed up by backup server 118, since its data as changed since the previous backup operation.
5. Leaf node 202d is analyzed to determine that block identifier B4 has not changed, and traversal of hash trees 200a-b is complete.

After performing the above sample analysis, backup server 118 may proceed to retrieve the data based on the block identifier(s) that indicate data has changed, and has not yet been backed up. In this example, backup server 118 may send a request to a metadata server 110 for the data block identified by block identifier B3'. Upon receipt of the data block, backup server 118 stores the data block as a backup, and stores hash tree 200b (along with any accompanying metadata) for use in future backup and/or restoration operations.

In one implementation using trees, backup server 118 may retrieve the metadata from a metadata server 110 by requesting only child nodes whose parent node has changed. For example, starting with the root, if the root node has changed the children of the root node can then be requested. These nodes can then be compared to corresponding nodes in the previously stored tree to determine if those have changed. Children of any node that has changed can then be retrieved. This process can be repeated until leaf nodes are retrieved. For example, with reference to FIGS. 2A-B hash tree 200b may be the current metadata from metadata server 110, and hash tree 200a may be stored metadata from a previous backup operation. Backup server 118 may first retrieve root node 206 and analyze it to determine that hash H3' is different from its previous value of H3. In response, backup server 118 may then request nodes 204a-b from interior node level 204. Node 204a is analyzed to determine that hash H1 has not changed, and leaf nodes 202a-b may be skipped from further requests/analysis. Node 204b is analyzed to determine that hash H2' is different from its previous value of H2, and thus backup server 118 may proceed to request appropriate nodes of leaf level 202 (leaves 202c-d). Analysis may then continue as described above to determine that block identifier B3' is different from its previous value of B3 and that the data block corresponding to block identifier B3' needs to be backed up. This implementation may allow for performance increases by minimizing data that is transmitted between backup server 118 and metadata server 110 during the retrieval of metadata.

At some point, it may be desirable by clients 108 or an administrator of system 100 to increase the volume size assigned to a client 108 by adding more data blocks of storage space. In this situation, with backup servers 118 implementations configured to utilize metadata of an ordered list of block identifiers, any newly added block identifiers (corresponding to the new data blocks) may be appended to the end of the ordered list. Thus, during a backup operation, if a backup server 118 receives metadata of an ordered list that has more elements than that of metadata from a prior backup operation, backup server 118 can determine the newly added data blocks that must be backed up based on the additional list elements. The backup operation may proceed as described above with respect to the remaining elements.

Figure 2C:
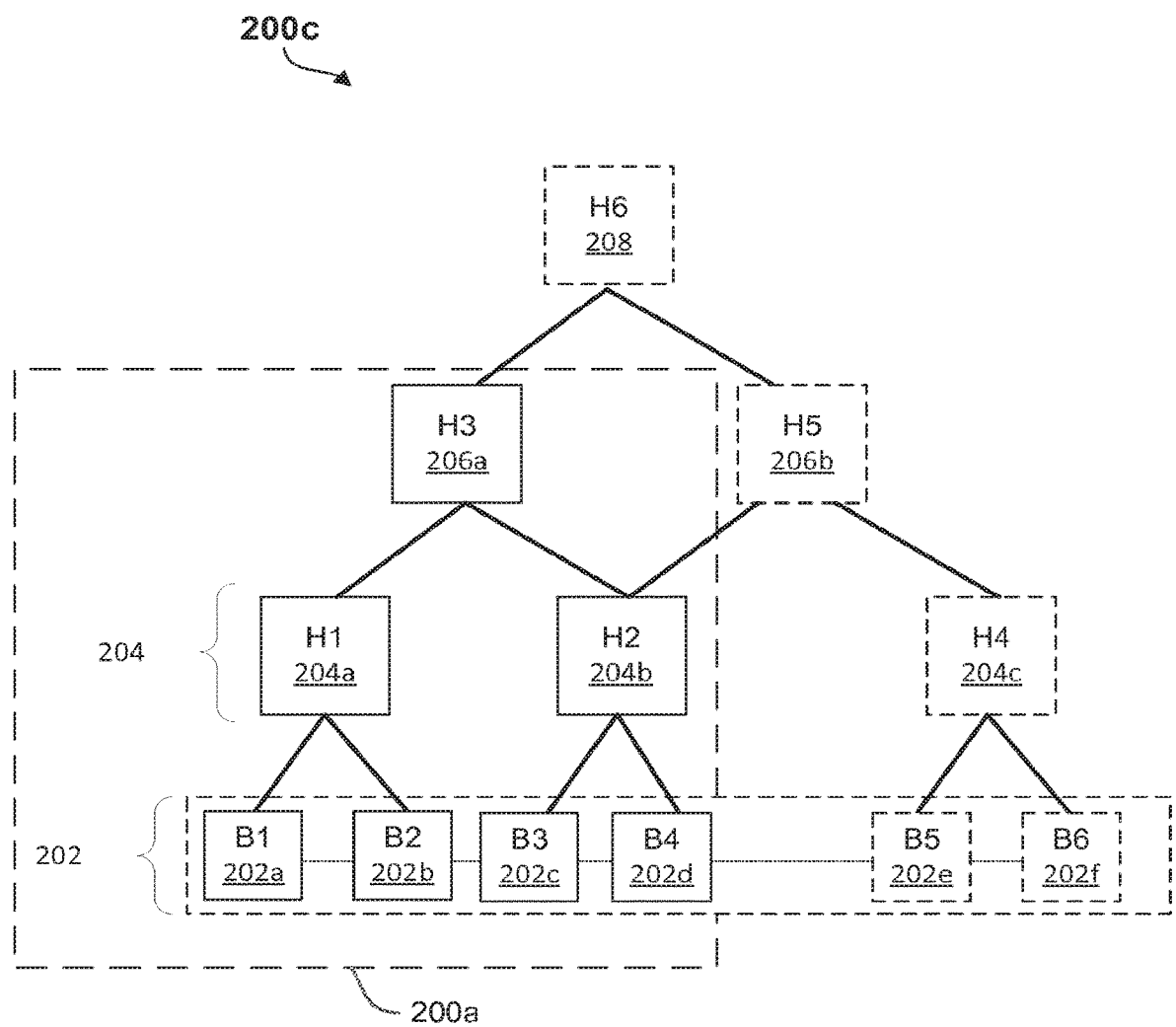
FIG. 2C depicts the hash tree illustrated in FIG. 2A, with newly added leaves, in accordance with an illustrative implementation.

FIG. 2C depicts the result of an increased volume size for implementations configured to utilize metadata of a hash tree. Hash tree 200c is based on hash tree 200a (which is included as a subtree and is denoted by a dashed box). Leaves 202e-f have been newly added to the hash tree and include block identifiers B5-B6, which correspond to the newly added data blocks of the increased volume size. As a result of the volume increase, hash tree 200a is restructured such that root node 206 becomes internal node 206a, and a new root node 208 is created. Further, internal nodes 206b and 204c are added to maintain the tree structure. Hashes H4-H6 are calculated based on the respective child values as described above. After such a restructuring of a hash tree, a backup operation may proceed as described above. However, backup server 118 can determine the newly added data blocks that must be backed up based on a new root node or additional leaves. Also, an implementation may make use of additional metadata that includes the indexes of the root nodes of previously stored trees. In this manner, backup server 118 may access the indexes to locate and compare the root node of a prior tree with the corresponding internal node of the current tree (e.g., root node 206 can be compared to internal node 206a). If the comparison indicates that the hashes have not changed, then backup server 118 may skip analyzing the subtree of the internal node, and a performance gain may be realized.

At some point, it may be desirable by clients 108 or an administrator of system 100 to reduce the volume size assigned to a client 108 by removing data blocks of storage space. In this situation, with backup server 118 implementations configured to utilize metadata of an ordered list of block identifiers, any removed block identifiers (corresponding to removed data blocks) may be removed from the end of the ordered list. Thus, during a backup operation, if a backup server 118 receives metadata of an ordered list that has fewer elements than that of metadata from a prior backup operation, backup server 118 can determine the backed up data blocks that may be removed based on the additional list elements in the stored list from the prior backup. The backup operation may proceed as described above with respect to the remaining elements. With backup server 118 implementations configured to utilize metadata of a hash tree including leaves that are a list of block identifiers, the backup server 118 may compare the trees (e.g. depth of the trees, leaf node count, etc.) to determine that there has been a change in volume size. In another implementation the size of the volume can be part of the metadata received by the backup servers, and this metadata can be compared to a previously received volume size to determine that a change in volume has occurred. The backup server may then determine the position of the current tree within the stored hash tree. After locating the position of the current root node, the leaf nodes (and corresponding parent nodes) that are not within the subtree of the current root node can be ignored. Once the corresponding root nodes have been determined, the backup operation may then proceed as described above with respect to the remaining nodes.

Figure 3:
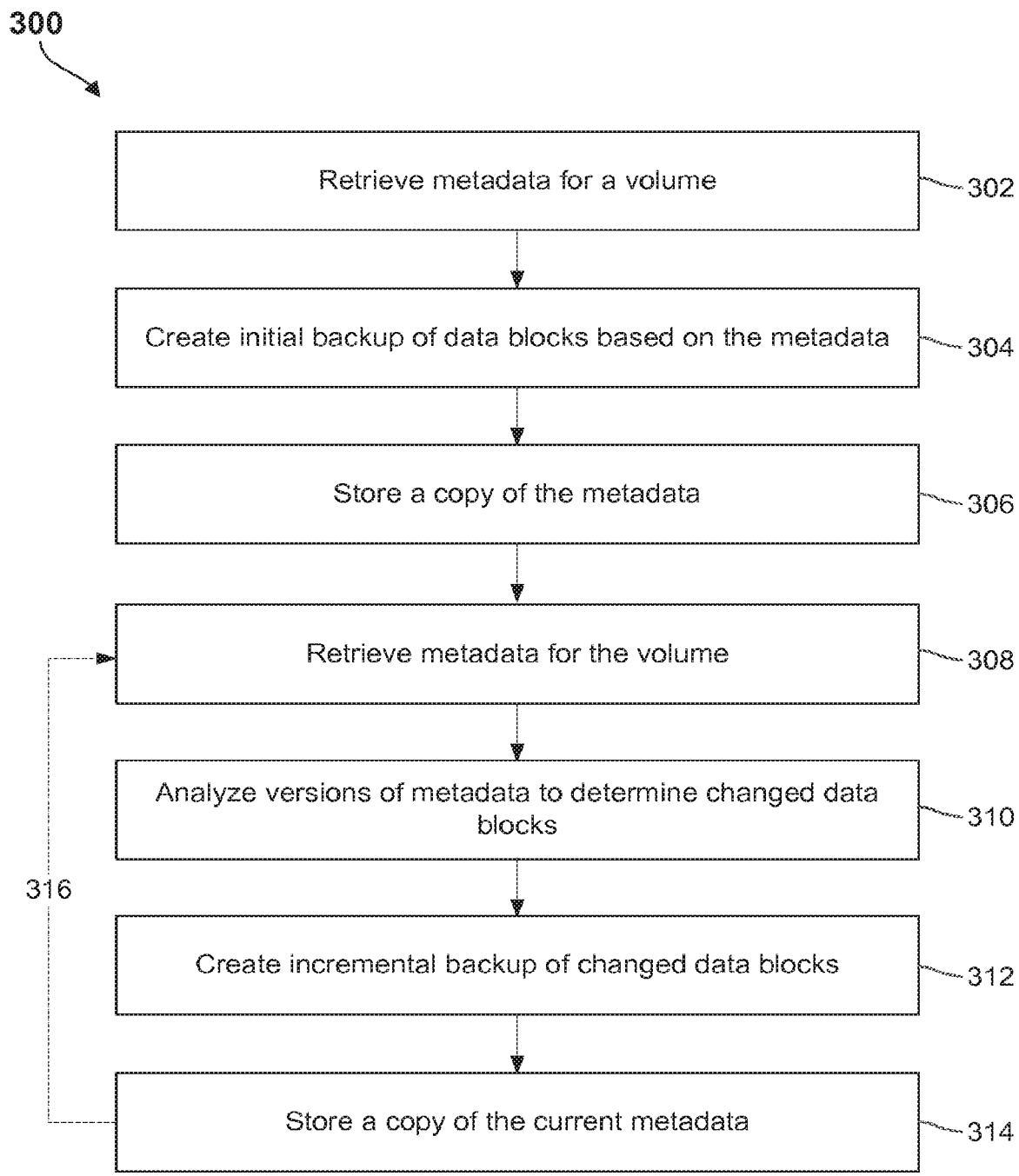
FIG. 3 shows a flow diagram of an incremental block level backup procedure in accordance with an illustrative implementation.

FIG. 3 shows a simplified flow diagram of an incremental block level backup procedure 300, in accordance with an embodiment. Additional, fewer, or different operations of the procedure 300 may be performed, depending on the particular embodiment. The procedure 300 can be implemented on a computing device. In one implementation, the procedure 300 is encoded on a computer-readable medium that contains instructions that, when executed by a computing device, cause the computing device to perform operations of the procedure 300. According to different embodiments, at least a portion of the various types of functions, operations, actions, and/or other features provided by the incremental block level backup procedure may be implemented at one or more nodes and/or volumes of the storage system. In an operation 302, metadata for a particular volume is retrieved (e.g., from a metadata server). For example, a backup sever may initiate a backup operation and retrieve initial metadata as described above. In an alternative embodiment, the backup server may be responding to a request to initiate a backup operation. For example, a client or backup software may submit a request via an API to perform a backup at a certain time. Alternatively, the backup server may be performing a backup according to a schedule (e.g., nightly backups, weekly backups, client-specified backups, etc.). In an operation 304, the initial backup of the data blocks of the volume is created. The metadata provides the block identifiers corresponding to the volume. The metadata may include an ordered list of block identifiers, a hash tree based on block identifiers, and other related data. The block identifiers are used to retrieve the corresponding data blocks to be backed up. For example, the backup server may analyze the metadata in order to request the transmission of and retrieve particular data blocks to be backed up. The request may be sent to the metadata server, which can facilitate the transmission of data from a block server. In an alternative embodiment, the backup server may retrieve the data blocks directly from the block server. The initial backup is a backup of all of the data of the volume as specified by the metadata. In an operation 306, the metadata used for the initial backup is stored for future use. In an operation 308, an incremental backup of the volume is initiated by retrieving the current metadata. For example, sometime after the creation of the initial backup, the backup server may retrieve updated metadata, which has been maintained by the metadata server to be current with the data blocks of the volume. As another example, metadata may be retrieved from a remote storage device. In an operation 310, the current metadata is compared to other metadata (e.g., the metadata from the immediately preceding backup operation, the metadata from the initial backup operation, the metadata from a remote device, etc.). For example, the backup server may analyze the metadata to determine changes in block identifiers as discussed above. Based on any changed block identifiers found during the analysis, in an operation 312, an incremental backup is created. For example, based on the identifiers of the changed data blocks, the backup server may retrieve only the changed data blocks to be backed up. The backup server may store received data blocks as described herein. In an operation 314, the metadata used for the incremental backup is stored for future use. The backup server may also generate additional metadata related to the backup procedure, including statistics to the amount of data backed up, the elapsed time of the backup process, etc. This process may repeat any number of times to create any number of incremental backups, as indicated by operation 316.

In another embodiment, the retrieval of the metadata and the comparison of the metadata to other metadata is performed by a device other than the backup server (e.g., by one or more devices of the storage system). For example, a storage device remote from the backup server may access metadata on the storage device, or may retrieve the metadata from another device, for example, from the metadata server. The storage device may analyze the metadata to determine changes in block identifiers as discussed above. Based on any changed block identifiers found during the analysis, an incremental backup can be created by transferring data to the backup server. For example, based on the identifiers of the changed data blocks, the storage device may transfer only the changed data blocks to the backup server to be backed up. The backup server may store received data blocks as described herein. The metadata used for the incremental backup can be stored by the storage device or can be transferred to another device (e.g., the metadata server) to be stored for future use.

Data Syncing in a Distributed System

In various embodiments, data can synced/replicated to another location. For example, data from a source system can be copied to a replica server. Data can be replicated locally, to another volume in its cluster, to another cluster, to a remote storage device, etc. Data that can be replicated includes, but is not limited to, block server data, metadata server data, etc. Replicated data is a representation of the data on the source system at a particular point in time. To reduce impact on the source system during replication, the replication process does not stop incoming I/O operations. To allow I/O operations to continue during a replication, writes that occur during the replication must be properly handled to avoid mismatches in data between the live data and the corresponding replicated data.

Figure 4:
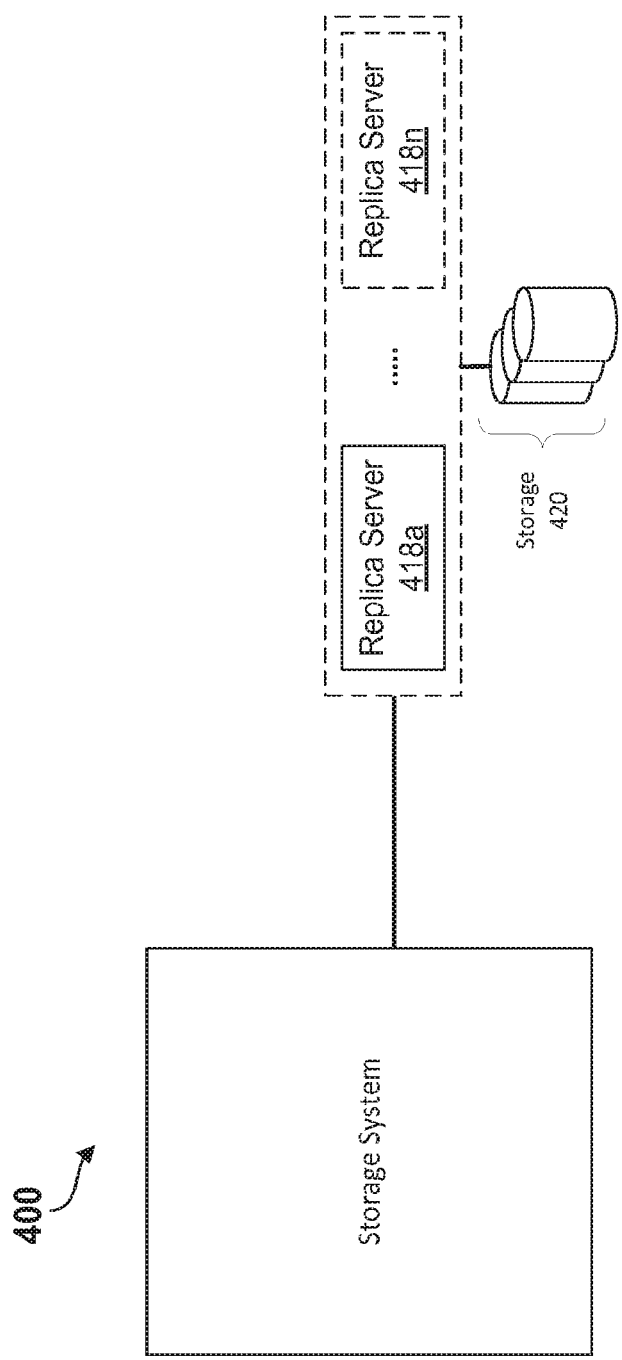
FIG. 4 depicts a distributed storage system in accordance with an illustrative implementation.

FIG. 4 depicts a distributed storage system 400 in accordance with an illustrative implementation. The storage system 400 stores live client data and may be configured as discussed above regarding system 100 (e.g., including client layer 102, metadata layer 104, block server layer 106, and storage). The storage system 400 can also include one or more replica servers 418a-418n. Replica servers 418a-418n can interface with the metadata and/or block servers of the storage system 400 in order to maintain synchronized (replicated) copies of data stored by the storage system 400. Replica servers 418a-418n are coupled to storage 420, which may store backups of volume data (e.g., backups of block level data of a client volume), synchronized data of client volume, snapshots of a client volume, and associated metadata. Storage 420 may include multiple hard disk drives (HDDs), solid state drives (SSDs), hybrid drives, or other storage drives. In one implementation, storage 420 can be a cluster of individual drives coupled together via a network. Replica servers 418 can store backup copies of the data blocks of storage system 400 according to any number of formats in storage 420, and translation from the format of the data blocks may occur.

In one embodiment, a replica server 418 maintains a live synchronized copy of data blocks of a client volume (e.g., a mirror copy of the client volume). To maintain synchronization, requests to write data that are provided by a client to storage system 400 may also be transmitted to the replica server 418. In this manner, data written to storage system 400 can be synchronized and stored on replica server 418 in real-time or semi real-time. Synchronization of volume data on replica server 418 includes synchronizing the metadata of storage system 400 that identifies blocks in a client volume. As discussed above, metadata servers of the storage system store metadata that includes a list of block identifiers that identifies blocks in a volume. The block identifiers may be hexadecimal numbers, and other representations may be used. Additional metadata may also be included (e.g., inode numbers, directory pointers, modification dates, file size, client addresses, list details, etc.). The block identifiers uniquely identify the data of a block and are a hash based on the content of the data block. In an embodiment, the metadata includes an ordered list structure of block identifiers. In another embodiment, the ordered list is structured as the leaves of a hash tree (e.g., a Merkle tree, etc.) and the metadata includes the hash tree. In an implementation utilizing a tree, when a write request is received and data is written to a block of a volume, values of the leaves (and inner nodes) of the tree change to corresponding to the changes of the block. Thus, replica server 418 can maintain a live synchronization tree that is updated to parallel the tree maintained by a metadata server of storage system 400 for a particular client volume.

Figure 5:
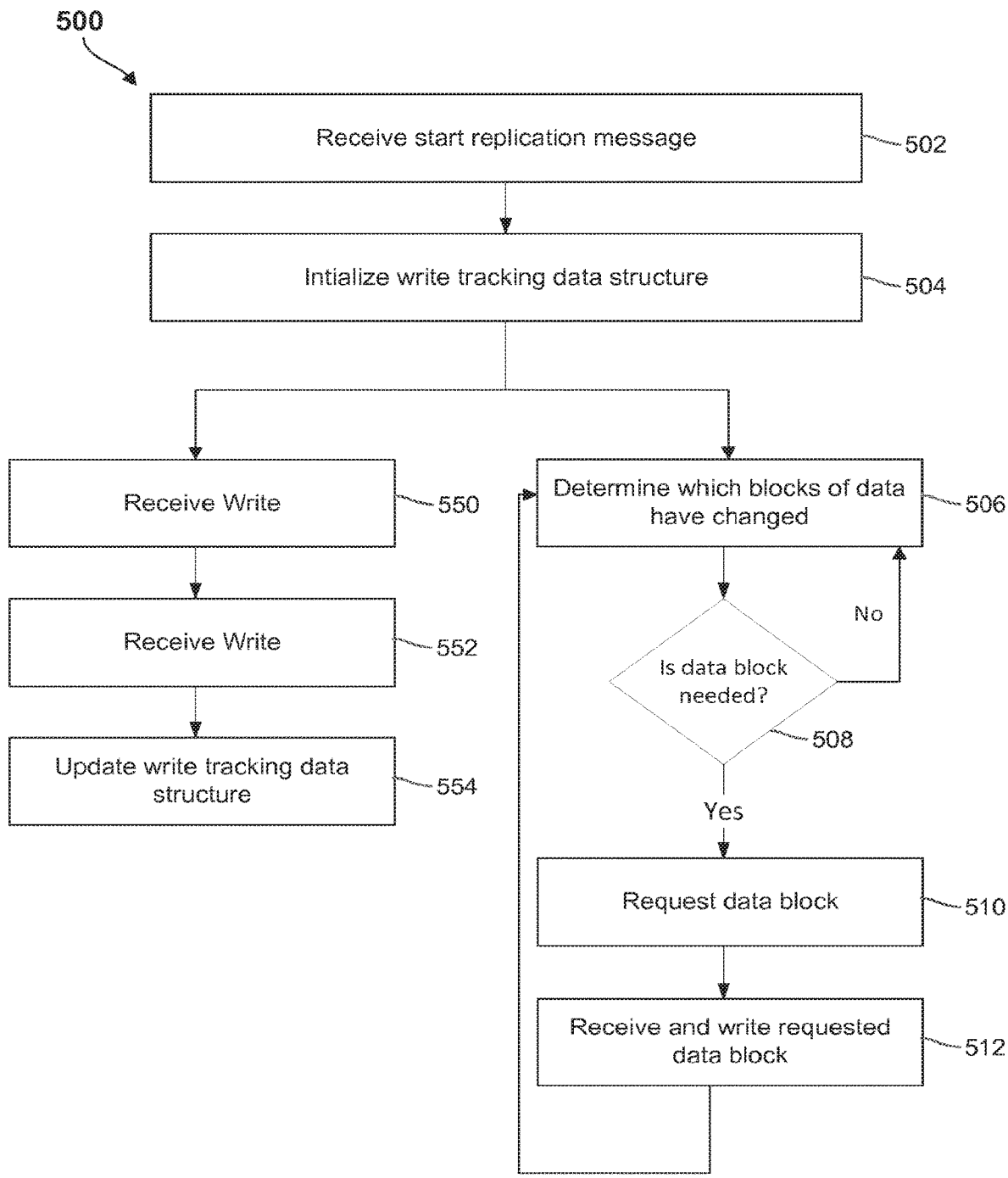
FIG. 5 shows a flow diagram for replicating data in accordance with an illustrative implementation.

FIG. 5 shows a flow diagram for replicating data in accordance with an illustrative implementation. Replication begins with a replica server receiving a start replication message from a source system (502). Upon receipt of the start replication message, the replica server initiates a data structure that will be used to track writes that occur during the replication process (504). In one embodiment, the data structure is a bit field where each bit represents a single unit of information, e.g., a block, a sub-block, etc. Each bit in the bit field represents if a particular unit has been written to after the start of the replication processes. In this embodiment, the bit field will be initialized to 0. At some point after sending the start replication message, the source system sends over replication data to the replica server. Similar to the block level backup embodiments, merkle trees can be used to minimize the amount of data that is required to be transferred between the source system and the replica server.

While the replication data is being sent to the replica server, data writes can be received at the source system. For example, a user may be writing new data to a file or metadata related to a user volume could be updated. The source system will handle the writes and while the replication process is active will also send the writes to the replica server. For example, the replica server can receive an I/O request to write a block of data (550). Upon receipt, the replica server can write the block of data (552) and will also update the bit associated with the block in the bit field to 1 (554). After the bit is set, the data write on the replica server is complete.

As part of the replication process, the replica server determines which blocks of data are needed from the source system (506). For example, a merkle tree comparison as described above can be used to determine blocks of data that have changed since a previous point-in-time image. One or more of the changed blocks of data, however, may have been changed again since the start of the replication process. Accordingly, the data will have already been sent to the replica server and requesting this data again is unneeded. Before requesting the block of data from source system, the bit field can be checked to determine if the block has already been received (508). If the block has not been updated, then the block of data is requested from the source system (510). The block is received (512) and written to storage. If the block has been updated, then no request for that block of data needs to be sent to the source system. This continues until there are no longer any data blocks that are needed from the source system. Once there are no longer any data blocks, the volume has been replicated. The replication system can send a message to the source system indicating that replication is complete. Upon receipt, the source system can stop forwarding I/O to the replication system.

In one embodiment, a block is the smallest amount of data that is written to storage in a single write operation. A block, however, can be divided into smaller sub-blocks, such that each unit of a block can be written to separately. As an example, a block can be 4 kilobytes in size and broken down into sixteen 256 byte sub-blocks. In this embodiment, the data structure corresponds to the sub-blocks and not the blocks. While replication is being done, a write to a sub-block can be received. The write command can include the data for the entire block or just the sub-block of data. The write can update a cache that is associated with the sub-block or could write the sub-block to storage. When only a sub-block is received in the write request, the block that contains the sub-block is retrieved and the sub-block is updated appropriately. Later during replication, the Merkle tree comparison can be used to determine that the block with the updated sub-block needs to be retrieved from the source system. For example, another sub-block may have been update from the previous replication. The entire block can be retrieved. The corresponding block on the replica server is retrieved and updated. To update the corresponding block on the replica server, the data structure is used to update each sub-block from the block retrieved from the source system. For sub-blocks where the data structure indicates that the sub-block has been updated during the replication process, the sub-block is not updated since it already has the latest data. If the data structure indicates that a sub-block has not been updated, that sub-block is updated with the corresponding sub-block received from the source system. To reduce unnecessary data transfers, before the replica server requests a block, the replica server can determine if all the sub-blocks of a block have been updated during the replica process. In this case, the replica server has already replicated this block and there is no need to request that block of data from the source system.

As described above, replica servers 418*a*-418*n* can be configured to create point-in-time images of components of the data of storage system 400. In one embodiment, each point-in-time image includes corresponding metadata (e.g., a hash tree) that identifies the blocks of the point-in-time image. The hash tree of a point-in-time image is based on the block identifiers of the data stored for the point-in-time image. A replica server 418 may create one or more point-in-time images of a component of the data of storage system 400, and each point-in-time image may be created according a defined schedule, or on demand (e.g., in response to a client demand, or as demanded by an administrator of storage system 400, etc.). The source system may also create various copies/replicas of a volume locally. For example, every day a replica of a volume can be scheduled. A remote replication system may only replicate a subset of the replicas that are local to the source system. For example, a remote replication system can request a single local copy every week rather than each of the daily local replicas. In another embodiment, the remote replication system can make a replica of the current live volume and ignore any other local replicas of the volume.

In the instance that a replica server 418 goes offline (e.g., due to a failure, being manually taken offline, or otherwise), the replica server 418 may be brought back online and resume synchronizing volume data with storage system 400. However, due to the period of time that the replica server 418 was offline, the data of replica server 418 may be out of sync with the volume data of storage system 400. Accordingly, replica server 418 may retrieve the data that is needed from storage system 400 to re-synchronize with the live volume data of storage system 400. In one embodiment, replica server 418 may implement one or more techniques of the block level incremental backup process to synchronize the volume data. For example, replica server 418 can retrieve the metadata for a live volume (e.g., a tree corresponding to the live volume as maintained by a metadata server). Replica server 418 may then analyze versions of metadata (e.g., comparing the out-of-date synchronization tree of replica server 418 and the retrieved live volume tree). Based on this analysis, replica server 418 can determine changed data blocks of the volume and what blocks needs to be retrieved from storage system 400 to synchronize the volume data. The replica server 418 may request any changed data blocks from storage system 400 and the retrieved blocks may be stored. As replica server 418 is synchronizing its volume data, write requests may still be received and the point-in-time image can still be created. In the instance that a new point-in-time image is being created and the volume data of replica server 418 is not fully synchronized with the live volume data of storage system 400, a data block may not yet be available in the data of replica server 418 to be stored in the new point-in-time image. For example, referring to the new point-in-time image creation process discussed above, the comparison of the metadata of the new tree with the metadata of the live tree may indicate that a block identifier (and therefore block data) has changed. However, the changed block may not yet be synchronized in the volume data of replica server 418. In this scenario, replica server 418 may retrieve the changed block data directly from the storage system 400 (as opposed to pointing to or retrieving the changed block data from the synchronized volume data of replica server 418 as discussed above).

After replication of a volume has completed, the replication can be verified. In one embodiment, this is done by the source system sending to the replica system one or more merkle tree nodes. The replica system can then compare the received merkle tree nodes with the corresponding merkle tree nodes of the replicated copy of the source volume. If any corresponding nodes do not match, the data was not properly replicated between the source system and the replica system. In this embodiment, the merkle tree on the replica side is updated as blocks of data are written to cached data structures and/or storage. Accordingly, the merkle tree is being updated on the replica system in a similar way as the merkle tree was updated on the source side. In one embodiment, the top level node of the merkle tree is compared. In other embodiments, the top two, three, etc., layers of the merkle tree are compared. For this comparison to work properly, the source side and the replica side must be in sync in regard to any data that is to be written. For example, if data is written on the source side, the replica side must also handle that write prior to the verification step. In one embodiment, this is accomplished through messaging between the source and replica systems. Once the replication is complete, the replica server can send a message requesting verification data. The source system can pause handling write requests until the verification data, e.g., the merkle tree nodes, are sent to the replica side. The replica side receiving the verification data handles any queued write requests prior to comparing the received verification data with local data. Once verification is done, the replica system can send a message and the I/O can continue. In another embodiment, the replica side can queue any received I/O requests from the source side. This allows the source side to begin handling I/O as soon as the verification data has been sent to the replica system. Once the verification is done, the replica system can handle any queued I/O requests. Verification can be done at any point during the replication process. The only requirement is that the source and replica side be in sync in regard to handling write requests. For example, after a certain number of blocks have been replicated or after a predetermined amount of time has passed, the replica server can request verification data from the source system.

Replication data between different systems can impact the performance of both systems. Quality of service can be implemented on both the source system and the replica system to ensure adequate service is provided based upon quality of service provisions. Embodiments of quality of service provisions that can be used in replication are described in U.S. application Ser. No. 13/856,958, which is incorporated by reference in its entirety. The quality of service allocated for I/O for a particular volume can be different on the source system compared to the replica system. For example, the replica system may have allocated 1,000 input output per second (IOPs), while the source system has allocated 5,000 IOPs for a particular volume. In this situation, the source system could overload the replica system's ability to handle the IOPs associated with replicating the volume from the source system to the replica system. Once the IOPs threshold has been reached on the replica system, the handling of I/O can be paused. A timer can be used to monitor how long I/O has been paused. If the timer exceeds some threshold, the replication of the source volume can be stopped and reported.

To reduce replications from being stopped, volumes that are to be replicated can be sorted based upon quality of service (QoS) parameters associated with the volumes. In one embodiment, sorting is done on the sum of QoS parameters from the source system and the replica system. This sum can represent a relative importance of a volume, with higher QoS parameters being more important than lower level QoS parameter volumes. In another embodiment, the ratio of the replica QoS parameter to the source QoS parameter is used to sort the volumes. Volumes with higher ratios indicate that the replication of those volumes are likely to successfully finish. Volumes whose ratios fall below a threshold amount can be flagged as volumes whose replication may not successfully finish due to QoS provisions. For example, if the ratio is less than one, the source side's QoS provisions could force the replica side to throttle I/O to the point that the replica side terminates the replication as described above. In another embodiment, the volumes can be sorted based upon the replica system's QoS parameter only. This allows volumes to be given high replication priority by increasing the QoS provisions of the volume on the replica server, without having to modify the source side's QoS provisions. Accordingly, a replication of a volume can be assured to successfully complete based upon a high QoS parameter on the replica side. In another embodiment, the volumes can be sorted based upon the source system's QoS parameter only. Once the volumes have been sorted, replication can begin in an ordered fashion based upon the sorting. Warnings can be generated for any volume that is below some threshold, e.g., ratio below a threshold, sum is below a threshold, etc. The warnings can provide information regarding the replication and the QoS parameters, such that the QoS parameters can be modified to remove future warnings.

One or more flow diagrams have been used herein. The use of flow diagrams is not meant to be limiting with respect to the order of operations performed. The herein-described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

What is claimed is:

1. A system comprising:
a processor; and
a non-transitory computer-readable medium having instructions stored thereon that when executed by the processor cause the system to:
   maintain a data structure indicative of a subset of data blocks that have been written to a replicated volume of the system during synchronization of the data blocks from a source volume of the system to the replicated volume;
   compare first metadata with second metadata to determine changes in content of the data blocks of the source volume between a first point-in-time and a second point-in-time, wherein the first metadata is a first hash tree having block identifiers indicating the content of the data blocks of the source volume at the first point-in-time and the second metadata is a second hash tree having the blocks identifiers indicating the content of the data blocks of the source volume at the second point-in-time, wherein the first point-in-time is prior to the second point-in-time; and
   for each data block of the source volume determined to have changed based upon comparison of the first and second hash trees, update the replicated volume with the data block when the data structure indicates the data block has not been written to the replicated volume during the synchronization.

2. The system of claim 1, wherein each of the block identifiers comprises a hash of the content of a corresponding data block that uniquely identifies the corresponding data block of the volume.

3. The system of claim 1, wherein comparison of the first metadata and the second metadata comprises:
analyzing whether a block identifier of the first hash tree is different from the block identifier of the second hash tree; and
responsive to a result of the analyzing being affirmative, updating the replicated volume with the data block corresponding to block identifier of the first hash tree.

4. The system of claim 1, wherein each of the first hash tree and the second hash tree further comprises:
a plurality of leaf nodes (leaves) configured to store the block identifiers; and
a non-leaf node coupled to two or more of the leaves, the non-leaf node storing a hash value of the block identifiers of the two or more leaves.

5. The system of claim 4, wherein comparison of the first metadata and the second metadata comprises:
analyzing whether the hash value of the non-leaf node of the first hash tree is different from the hash value of the non-leaf node of the second hash tree;
responsive to a result of the analyzing being affirmative, evaluating whether a block identifier of a leaf node of the two or more leaves of the first hash tree is different from the block identifier of the corresponding leaf node of the two or more leaves of the second hash tree; and
responsive to a result of the evaluating being affirmative, updating the replicated volume with the data block corresponding to the block identifier of the leaf node of the two or more leaves of the first hash tree.

6. The system of claim 1, wherein of the first hash tree and the second hash tree further comprises:
a plurality of leaf nodes (leaves) configured to store the block identifiers;

two or more internal nodes, each internal node coupled to two or more of the leaves and configured to store a first hash value of the block identifiers of the two or more leaves; and a root node coupled to the two or more internal nodes and configured to store a second hash value of the first hash values of the two or more internal nodes.

7. The system of claim 6 wherein comparison of the first metadata and the second metadata comprises:

analyzing whether the second hash value of the root node of the first hash tree is different from the second hash value of the root node of the second hash tree;

responsive to a result of the analyzing being affirmative, evaluating whether the first hash value of each non-leaf node of the first hash tree is different from the first hash value of each non-leaf node of the second hash tree;

responsive to a result of the evaluating being affirmative, determining whether a block identifier of a leave coupled to the non-leaf node of the first hash tree is different from the block identifier of the corresponding leave coupled to the corresponding non-leaf node of the second hash tree; and responsive to a result of the determining being affirmative, updating the replicated volume with the data block corresponding to block identifier of the first hash tree.

8. The system of claim 1, wherein the instructions further cause the system to:

initiate the data structure to track the data blocks written to the replicated volume; and update the data structure to indicate the data blocks written to the replicated volume.

9. The system of claim 1, wherein the data blocks of the replicated volume are randomly and evenly distributed across a cluster containing the replicated volume.

10. A method comprising:

maintaining a data structure indicative of a subset of data blocks that have been written to a replicated volume of a storage system during synchronization of the data blocks from a source volume of the storage system to the replicated volume;

comparing first metadata with second metadata to determine changes in content of the data blocks of the source volume between a first point-in-time and a second point-in-time, wherein the first metadata is a first hash tree having block identifiers indicating the content of the data blocks of the source volume at the first point-in-time and the second metadata is a second hash tree having the blocks identifiers indicating the content of the data blocks of the source volume at the second point-in-time, wherein the first point-in-time is prior to the second point-in-time; and for each data block of the source volume determined to have changed based upon comparison of the first and second hash trees, updating the replicated volume with the data block when the data structure indicates the data block has not been written to the replicated volume during the synchronization.

11. The method of claim 10, wherein each of the block identifiers comprises a hash of the content of a corresponding data block that uniquely identifies the corresponding data block of the volume.

12. The method of claim 10, wherein said comparing further comprises:

analyzing whether a block identifier of the first hash tree is different from the block identifier of the second hash tree; and responsive to a result of the analyzing being affirmative, updating the replicated volume with the data block corresponding to block identifier of the first hash tree.

13. The method of claim 10, wherein each of the first hash tree and the second hash tree further comprises:

a plurality of leaf nodes (leaves) configured to store the block identifiers; and a non-leaf node coupled to two or more of the leaves, the non-leaf node storing a hash value of the block identifiers of the two or more leaves.

14. The method of claim 13, wherein said comparing further comprises:

analyzing whether the hash value of the non-leaf node of the first hash tree is different from the hash value of the non-leaf node of the second hash tree;

responsive to a result of the analyzing being affirmative, evaluating whether a block identifier of a leaf node of the two or more leaves of the first hash tree is different from the block identifier of the corresponding leaf node of the two or more leaves of the second hash tree; and responsive to a result of the evaluating being affirmative, updating the replicated volume with the data block corresponding to the block identifier of the first hash tree.

15. The method of 10, wherein each of the first hash tree and the second hash tree further comprises:

a plurality of leaf nodes (leaves) configured to store the block identifiers;

two or more internal nodes, each internal node coupled to two or more of the leaves and configured to store a first hash value of the block identifiers of the two or more leaves; and a root node coupled to the two or more internal nodes and configured to store a second hash value of the first hash values of the two or more internal nodes.

16. The method of claim 15, wherein said comparing further comprises:

analyzing whether the second hash value of the root node of the first hash tree is different from the second hash value of the root node of the second hash tree;

responsive to a result of the analyzing being affirmative, evaluating whether the first hash value of each non-leaf node of the first hash tree is different from the first hash value of each non-leaf node of the second hash tree;

responsive to a result of the evaluating being affirmative, determining whether a block identifier of a leave coupled to the non-leaf node of the first hash tree is different from the block identifier of the corresponding leave coupled to the corresponding non-leaf node of the second hash tree; and responsive to a result of the determining being affirmative, updating the replicated volume with the data block corresponding to block identifier of the first hash tree.

17. The method of claim 10, further comprising:

initiating the data structure to track the data blocks written to the replicated volume; and updating the data structure to indicate the data block written to the replicated volume.

18. The method of claim 10, wherein the data blocks of the replicated volume are randomly and evenly distributed across a cluster containing the replicated volume.

19. A non-transitory computer-readable medium embodying a set of instructions, which when executed by a processor of a storage system, causes the storage system to:

maintain a data structure indicative of a subset of data blocks that have been written to a replicated volume of the storage system during synchronization of the data blocks from a source volume of the storage system to the replicated volume;

compare first metadata with second metadata to determine changes in content of the data blocks of the source volume between a first point-in-time and a second point-in-time, wherein the first metadata is a first hash tree having block identifiers indicating the content of the data blocks of the source volume at the first point-in-time and the second metadata is a second hash tree having the blocks identifiers indicating the content of the data blocks of the source volume at the second point-in-time, wherein the first point-in-time is prior to the second point-in-time; and for each data block of the source volume determined to have changed based upon comparison of the first and second hash trees, update the replicated volume with the data block when the data structure indicates the data block has not been written to the replicated volume during the synchronization.

20. The non-transitory computer-readable medium of claim 19, each of the block identifiers comprises a hash of the content of a corresponding data block that uniquely identifies the corresponding data block of the volume.

21. The system of claim 1, wherein the first hash tree and the second hash tree comprise Merkle trees.

22. The system of claim 1, wherein the data structure comprises a bit field.

\* \* \* \* \*